US006651117B1

(12) United States Patent
Wilson et al.

(10) Patent No.: US 6,651,117 B1
(45) Date of Patent: Nov. 18, 2003

(54) NETWORK STACK LAYER INTERFACE

(75) Inventors: Andrew W. Wilson, Fremont, CA (US); Paul J. von Stamwitz, Mountain View, CA (US); John Carrier, Friday Harbor, WA (US); Renato Maranon, Livermore, CA (US); John Tai, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 418 days.

(21) Appl. No.: 09/680,142

(22) Filed: Oct. 3, 2000

Related U.S. Application Data

(60) Provisional application No. 60/201,626, filed on May 3, 2000, provisional application No. 60/189,639, filed on Mar. 14, 2000, and provisional application No. 60/163,266, filed on Nov. 3, 1999.

(51) Int. Cl.[7] .................... G06F 13/00; G06F 13/12; G06C 15/08
(52) U.S. Cl. .................... 710/33; 710/74; 370/392; 370/351
(58) Field of Search .................... 710/74, 23, 33; 709/232–236; 370/392, 375, 351

(56) References Cited

U.S. PATENT DOCUMENTS

| 5,937,169 A | * | 8/1999 | Connery et al. | 709/250 |
| 6,246,683 B1 | * | 6/2001 | Connery et al. | 370/392 |
| 6,434,620 B1 | * | 8/2002 | Boucher et al. | 709/230 |

\* cited by examiner

Primary Examiner—Kim Huynh
(74) Attorney, Agent, or Firm—Martine & Penilla, LLP

(57) ABSTRACT

A network stack layer interface is provided for efficient communication between network stack layers. The network stack layer interface includes a header portion that defines various characteristics of the network stack layer interface. In addition, a buffer descriptor is included that defines data that was, or will be, transmitted over the computer network. The buffer descriptor includes a memory address pointer to the data. In this manner, information is passed between network stack layers via the network stack interface, resulting in fast network data transfer with reduced data copying.

15 Claims, 13 Drawing Sheets

NETWORK STACK LAYER INTERFACE

CROSS REFERENCE To RELATED APPLICATIONS

This application claims priority from: (1) U.S. Provisional Patent Application No. 60/163,266, filed Nov. 3, 1999, entitled "SCSI OVER ETHERNET," (2) U.S. Provisional Patent Application No. 60/189,639, filed Mar. 14, 2000, entitled "ETHERNET STORAGE PROTOCOLS FOR COMPUTER NETWORKS," and (3) U.S. Provisional Patent Application No. 60/201,626, filed May 3, 2000, entitled "SCSI ENCAPSULATION PROTOCOL." Each of these provisional applications is herein incorporated by reference.

This application is also related to U.S. patent application Ser. No. 09/490,629, filed Jan. 24, 2000, entitled "ETHERNET STORAGE PROTOCOL NETWORKS," and U.S. patent application Ser. No. 09/490,630, filed Jan. 24, 2000, entitled "METHODS FOR IMPLEMENTING AN ETHERNET STORAGE PROTOCOL IN COMPUTER NETWORKS." Each of these non-provisional applications is hereby incorporated by reference.

BACKGROUND OF THE INVENTION

1. Field of the Invention

This invention relates generally to computer networking, and more particularly to network stack layer interfaces for efficiently communicating data between network stack layers in a computer network environment.

2. Description of the Related Art

The art of networking computers has evolved over the years to bring computer users a rich communication and data sharing experience. To provide users with such a rich communication experience, standard communication protocols have been developed to improve interoperability between network applications. One such standard is the International Organization for Standard's (ISO) layered communication protocol model called the Open Systems Interconnection (OSI) Reference Model, which is the most widely utilized network communication standard in use today.

The OSI Reference Model defines how messages are transmitted between nodes of a computer network. Generally, the OSI Reference Model is used as a guide to encourage interoperability among devices provided by various network equipment manufactures. As shown in FIG. 1, the OSI Reference Model 10 includes seven functional layers divided into two groups, host layers 12 and transfer layers 14.

The host layers 12 are utilized when a particular message is transmitted from the host machine or when a message is destined for that particular host machine. The host layers 12 comprise four network stack layers. These include an application layer 16, a presentation layer 18, a session layer 20, and a transport layer 22. The application layer 16 is the layer at which communication partners are identified, quality of service is identified, user authentication and privacy are considered, and constraints on data syntax are identified.

Generally part of the operating system, the presentation layer 18 converts incoming and outgoing data from one presentation format to another. For example, newly arrived text in the form of a text stream may be converted into a popup window. The session layer 20 sets up, coordinates, and terminates conversations, exchanges, and dialogs between applications executing at each end node. Finally, the lowest layer of the host layers 12 is the transport layer 22, which manages end-to-end control and error-checking, ensuring complete data transfer.

The host layers 12 are generally independent of the actual hardware used to form the computer network. However, the transfer layers 14 are not typically independent of the actual hardware used to form the network, and are therefore generally optimized for efficient performance on the particular devices for which they are designed.

The transfer layers 14 are used when any message passes through the host computer, regardless of whether it is intended for that particular host machine or not. Messages destined for another host machine are forwarded to another host, and are not passed up to the host layers 12.

The transfer layers 14 include a network layer 24, a data link layer 26, and a physical layer 28. The network layer 24 handles the routing and forwarding of data. Since larger networks typically include different types of MAC standards, the network layer 24 is used to facilitate communication between different types of networks.

The data link layer 26 provides error control and synchronization for the physical layer 28 by providing transmission protocol knowledge and management. Finally, the physical layer 28 conveys the bit stream through the network at the electrical and mechanical level.

For each message sent between the users, there is a flow of data through each of the functional layers mentioned above. When transmitting, data flows down through the layers starting with the application layer 16. When the message arrives at the receiving computer, data flows up through the layers starting with the physical layer 24, and ultimately to the end user.

To function properly, communication between the network stack layers must be provided. Hence, data arriving on the physical layer 28 must be provided to the data link layer 26, and then from the data link layer 26 to the network layer 24, and so on up through the rest of the network stack layers. Each network stack layer processes the data and passes it on to the next layer.

Conventionally, copying is used to pass processed data from one network stack layer to the next. Specifically, in a conventional network system, data processed by a particular network stack layer is copied to a buffer. The next network stack layer then reads the data from the buffer, processes it, and copies the processed data into another buffer. This process is then repeated for the rest of network stack layers. In other words, the entire data buffer must be copied to a new buffer each time a new network stack layer needs to access it.

However, copying data into buffers each time a network stack layer needs to pass data to another layer is extremely inefficient. Copying data into buffers is a slow process relative to other processes in the computer network. Moreover, buffer copying requires CPU time that could be better used performing other functions. Thus, conventional networking systems that perform buffer copying when passing data between network stack layers are extremely slow.

In view of the forgoing, there is a need for an interface that provides fast and efficient communication between network stack layers. The interface should avoid buffer copying, yet still provide reliable inter-layer communication. In addition, the interface should be essentially standardized, thus allowing similar routines to use the interface.

SUMMARY OF THE INVENTION

Broadly speaking, the present invention fills these needs by providing a network stack layer interface that efficiently facilitates communication between network stack layers. The interface is configured to pass memory address pointers between network stack layers to avoid buffer copying, thus greatly reducing the amount of copying performed during inter-layer communication. In one embodiment, the network stack layer interface includes a header portion defining various characteristics of the network stack layer interface. In addition, a buffer descriptor is included that defines data to be transmitted over the computer network when operating on a transmitting host, or to data that was transmitted over the computer network when operating on a target. The buffer descriptor includes a memory address pointer to the data. In this manner, information is passed between network stack layers via the network stack interface, resulting in fast network data transfer with reduced data copying.

In another embodiment, a method for transmitting data over a computer network via the network stack layer interface is disclosed. The method includes generating a first, second, and third SCSI information descriptor (SID), as described above. The first SID includes a memory address pointer that points to a first memory address of data to be transmitted over the computer network. The memory address pointer is then passed from the first SID to the second SID, and a storage header memory address pointer is further assigned to the second SID. At this point, the storage header memory address pointer and the data memory address pointer are both passed from the second SID to the third SID. The third SID is then assigned a transport header memory address pointer. Finally, a network interface device is afforded access to the third SID and utilizes the third SID to transmit at least a portion of the data over the computer network.

In yet another embodiment, a method for receiving data over a computer network via the network stack layer interface is disclosed. Similar to the transmitting method above, the receiving method includes generating a first, second, and third SCSI information descriptor (SID). In the receiving method, the third SID includes a memory address pointer to a packet buffer that includes data from a received data packet. The memory address pointer is passed from the third SID to the second SID, where it is modified to point to a first offset memory address that is offset from the beginning address of the packet buffer such that transport header data within the packet buffer is skipped. At this point, the memory address pointer from the second SID is passed to the first SID, where it is modified to point to a second offset memory address that is offset from the beginning of the packet buffer such that it addresses a data chunk within the packet buffer. Finally, the data chunk is copied from the data packet to system memory.

Advantageously, the present invention allows communication between layers of the network stack with very little inter-layer data copying, which is a great improvement over conventional network applications. Allowing the data to be obtained from the packet buffers without performing a copy operation for each network stack layer greatly increases the speed and efficiency of the network data transfer.

Moreover, the present invention makes use of a common header portion for each network stack layer interface. This allows the use of common function interfaces for several network stack layers, thus reducing the amount of coding needed to facilitate communication. In addition, common headers increase reliability by reducing the amount of new variables introduced into the system.

Finally, it will become apparent to those skilled in the art that the network stack layer interface of the present invention can have applicability in desk top and server applications, cluster server systems, storage area networks, and other storage networking applications. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a network stack layer interface in a computer network environment. The present invention provides improved inter-layer communication within a network stack in a computer network environment.

One preferred network environment is an Ethernet Storage Protocol (ESP), as described in related U.S. patent application Ser. No. 09/490,629, entitled "ETHERNET STORAGE PROTOCOL NETWORKS," which is incorporated herein in its entirety.

Prior to describing the present invention, a brief over view of the Ethernet Storage Protocol will be helpful. Briefly, an ESP network includes host computers equipped with hardware to enable communication using a lightweight transport protocol, such as a simple transport protocol (STP), as described in related U.S. patent application Ser. No. 09/490, 629. The STP is configured to eliminate the overhead and inefficiencies associated with prior art transport protocols, such as TCP. STP enables more efficient transfers of data over a communication link, such as a local area network (LAN). Communication can also occur over a larger network, such as the Internet with the additional implementation of the Internet Protocol (IP). Consequently, STP can either run on its own in a local environment or over IP. In a wide area network, it may also be beneficial to run STP over IP to enable communication over level 3 switches and/or routers.

The ESP also preferably takes advantage of a storage encapsulation protocol (SEP), described in related U.S. patent application Ser. No. 09/490,629, which is configured to encapsulate portions of storage data, such as SCSI data, ATAPI data, UDMA data, etc. The SEP has the following three functions: (1) identifying the command, data, status and message information segments; (2) associating commands with their data and status; and (3) providing flow control between host data buffers and target data buffers.

Although the present invention will be described with reference to Ethernet and SCSI technologies, it should be appreciated that the present invention is not limited to the transport of SCSI data over Ethernet. Other link and physical communication protocols can also be used by the present invention for communication over networks (e.g., LANs, WANs, Internet, etc.) other than Ethernet and SCSI.

Figure 1:
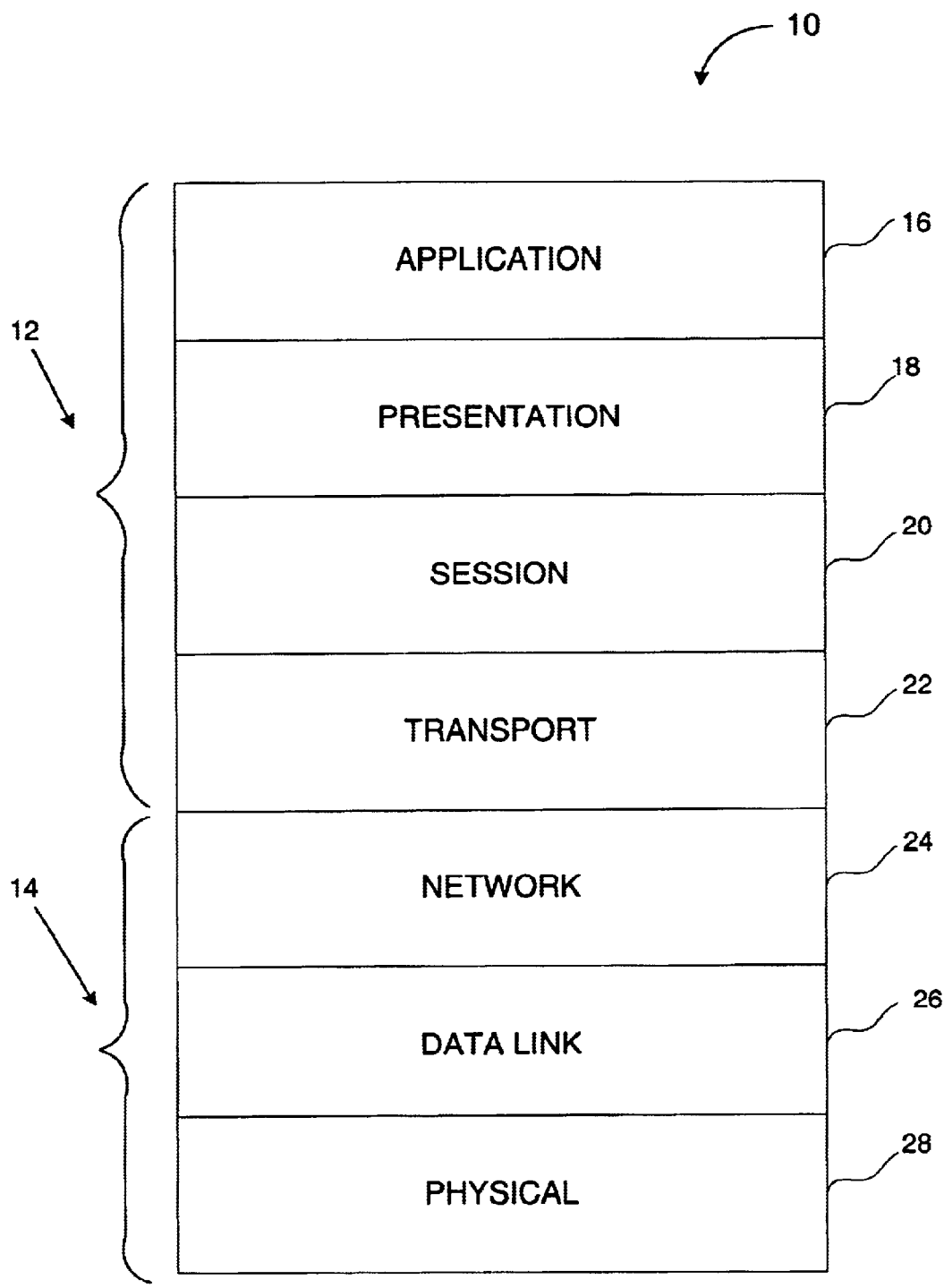
FIG. 1 is a layered diagram showing a conventional OSI Reference Model.
Figure 2:
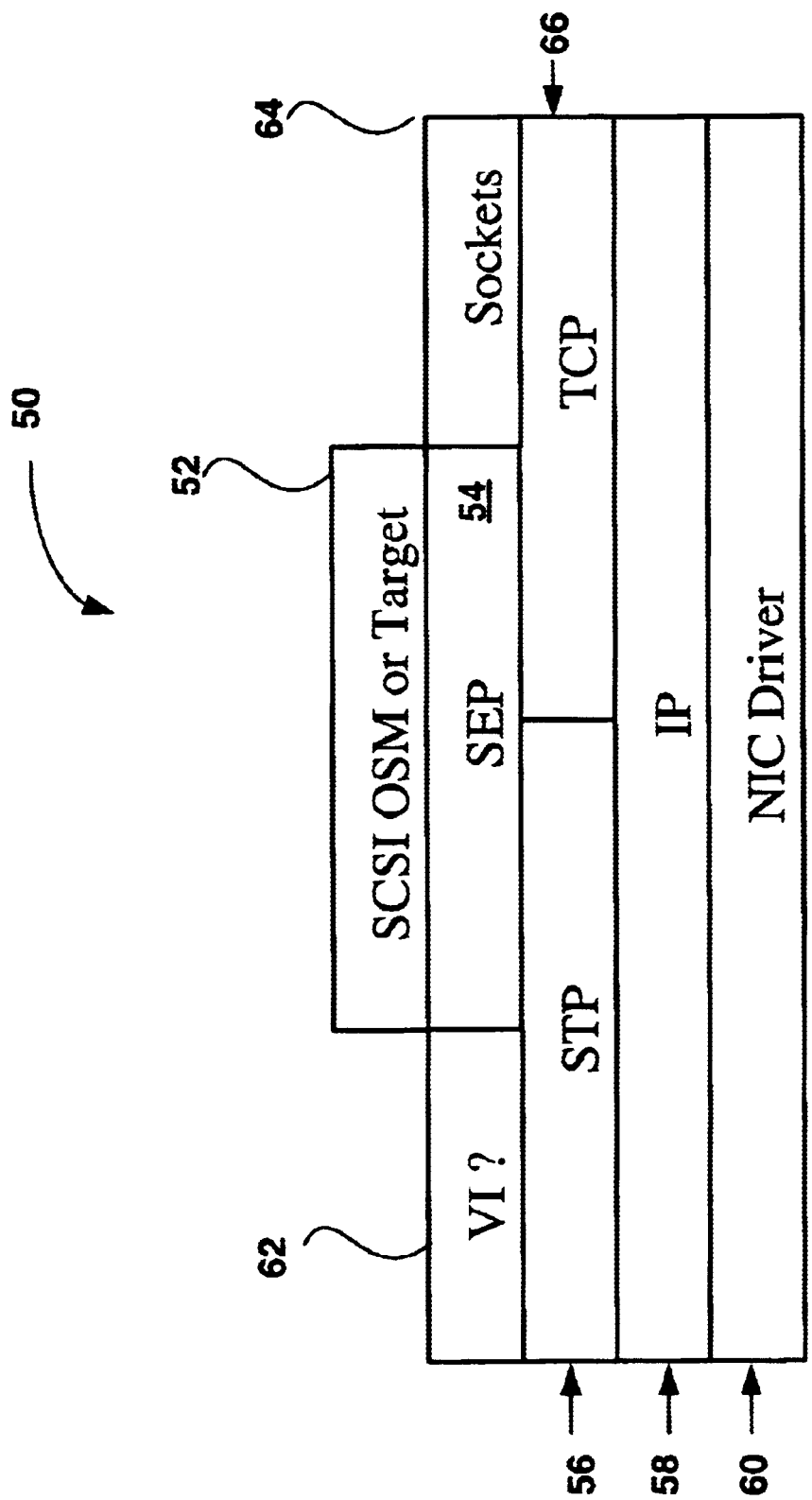
FIG. 2 is a layered diagram showing an exemplary network stack based on an ESP architecture, in accordance with an embodiment of the present invention.

FIG. 2 is a layered diagram showing an exemplary network stack 50 based on an ESP architecture, in accordance with an embodiment of the present invention. The network stack 50 includes a SCSI OSM/Target layer 52, an SEP layer 54, an STP layer 56, an optional Internet Protocol (IP) layer 58, and a Network Interface Card (NIC) driver layer 60. The network stack 50 may optionally include a VI layer 62 and/or Socket layer 64 in addition to, or in place of, the SEP layer 54. The network stack 50 may further optionally include a TCP layer 66 in addition to, or in place of, the STP layer 54.

During network communication, new SCSI transaction requests from the host machine pass from the SCSI OSM layer 52 to the SEP layer 54, then to the STP layer 56, and finally to the NIC driver NIC driver layer 60. Responses to the transaction request pass up the network stack 50. On the target side, requests proceed up the stack from the NIC driver layer 60 to the STP layer 56, then to the SEP layer 54, and finally to the SCSI target layer 52. Embodiments utilizing the optional IP layer 58, VI layer 62, Sockets layer 64, and/or TCP layer 66 require requests to pass through these layers as needed.

The present invention accomplishes the above-described data transfers utilizing a network stack interface called a SCSI Interface Descriptor (SID). As mentioned previously, although the present invention is described in terms of SCSI, other device interfaces and data can be communicated by present invention for transfer between network stack layers.

Broadly speaking, the present invention facilitates interlayer data transfer by passing memory address pointers (pointers) via SIDs. Essentially, data is stored in an original buffer, and thereafter pointers to the buffer are passed between network stack layers. Each layer then manipulates the pointers to refine them to point to particular areas within the buffer, and then sends the pointer on to the next network stack layer.

For example, when SCSI command data is transmitted over the physical wire, the NIC on the receiving host receives the data and places it into a buffer. Pointers to the buffer are then passed up to the STP layer 56 (and optionally the IP layer 58) using a SID. Resulting pointers are then passed to the SEP layer 54, which further processes the data, for example determining which user buffer it belongs in. The SEP resulting pointers are then passed to the SCSI target layer 52, which performs the SCSI command, for example initiating a SCSI transfer on a SCSI chip.

SIDs are particularly useful in relation to storage. In the past basic networking was concerned with layering. However, storage such as with RAIDs has been neglected until recently. Recent developments have made network storage a more prominent component of a computer network. Using SIDs with storage allows the use of the same software routines at the various network stack layers, thus adding to efficiency.

Figure 3:
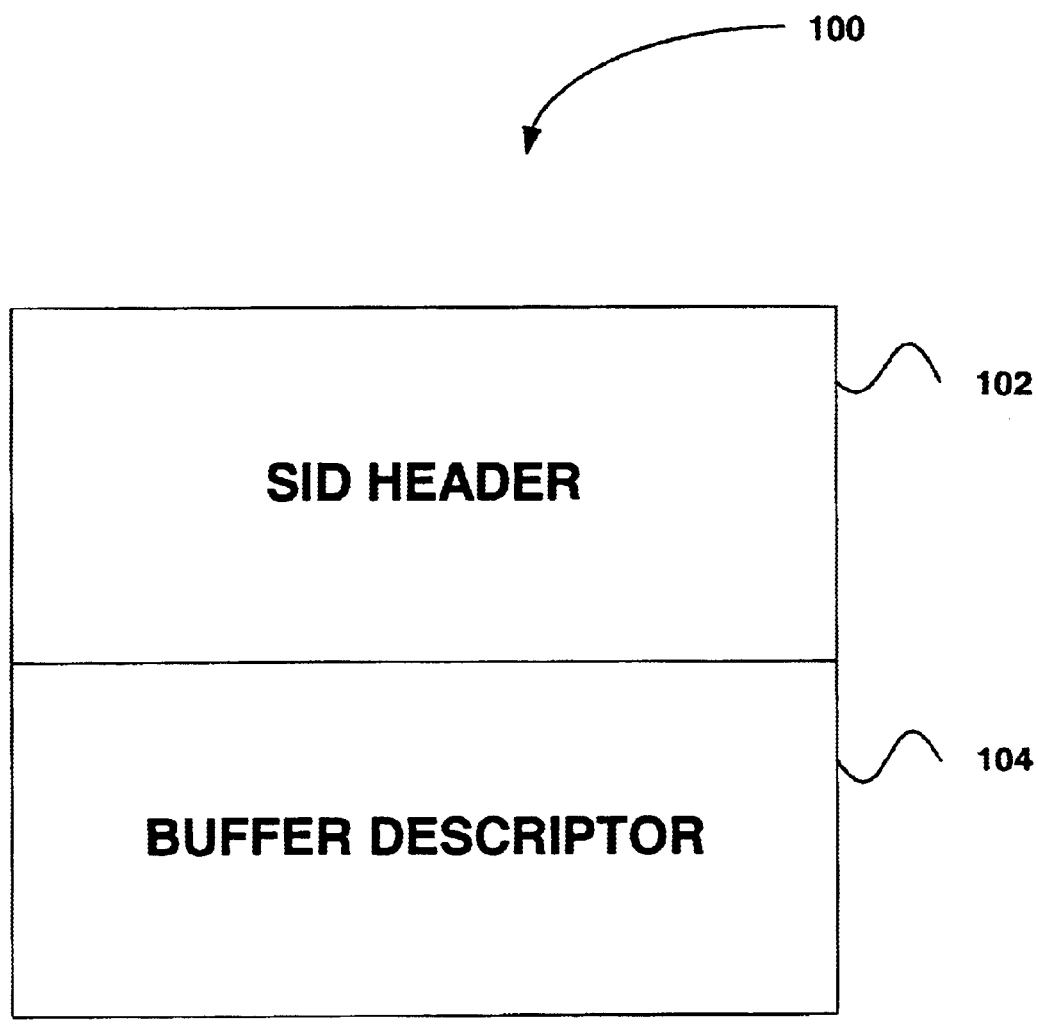
FIG. 3 is a block diagram illustrating a SCSI Interface Descriptor (SID), in accordance with an embodiment of the present invention.

FIG. 3 is a block diagram illustrating a SID 100, in accordance with an embodiment of the present invention. The SID 100 includes a SID header portion 102 and a buffer descriptor 104. Preferably, the SID header portion 102 includes a common SID header and a layer specific SID header. The common SID header preferably includes the same data fields for all SIDs in the system. Advantageously, this allows many of the same ancillary functions to be used on the SIDs throughout the system. The layer specific SID header includes data that is particularly useful for the specific layer utilizing the SID. Common SID headers and layer specific SID headers will be described in greater detail subsequently.

The buffer descriptor 104 includes a memory address pointer and a buffer length variable. The memory address pointer includes the memory address of a particular buffer. The buffer length variable defines the length of the buffer. In this manner, a network stack layer using a buffer descriptor 104 is able to both determine where in memory a particular buffer is located, and determine the length (or size) of the particular buffer. Each SID may include one or more buffer descriptors 104, depending on the particular use of the SID. For example, OSM SCSI SIDs on the SEP layer of a target host often include multiple buffer descriptors 104 defining various buffers of data received from the network, as described in greater detail below. Once pools of SIDs 100 are initialized within the system, they may be used as an interface between layers of the network stack.

Figure 4:
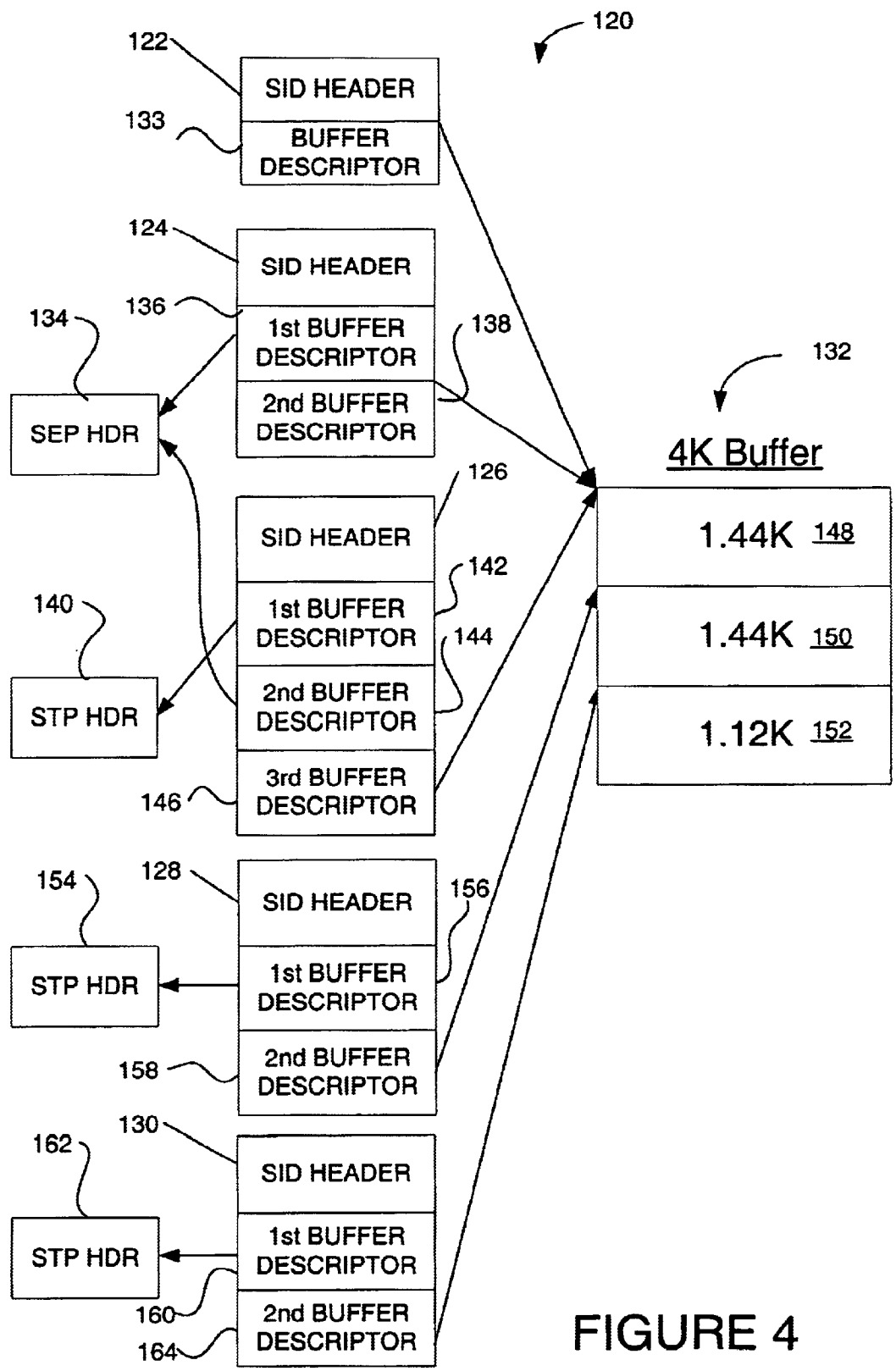
FIG. 4 is a block diagram showing an exemplary SID flow for transmitting data in a network environment, in accordance with an embodiment of the present invention.

FIG. 4 is a block diagram showing an exemplary SID flow 120 for transmitting data in a network environment, in accordance with an embodiment of the present invention. The SID flow 120 includes a SCSI OSM SID 122, a STREAM SID 124, a main NIC SID 126, a second NIC SID 128, and a third NIC SID 130.

This example assumes a user wants to transmit the data contents of a 4K buffer 132. The user starts by calling a SCSI layer program with an operating system defined pointer list having a memory address pointer pointing to the beginning of the 4K buffer 132. The SCSI layer software then copies the pointer into the SCSI OSM SID 122 and updates the SCSI OSM SID 122 to include a SCSI header portion and a SCSI buffer descriptor 133 having the memory address of the beginning of the 4K buffer, and the length of the 4K buffer 122. The SCSI OSM SID 122 is then passed to the SEP layer.

The SEP then utilizes the SCSI OSM SID 122 to create a STREAM SID 124. The SEP accomplishes this by first creating SEP header data 134 in memory. The SEP header data 134 will later be used by the target machine to identify the segments of the sent data, associate commands with their data, and provide flow control between the host data buffers and the target data buffers.

Next, the SEP creates the header portion and buffer descriptors of the STREAM SID 124. A first STREAM buffer descriptor 136 is provided with the memory address and length of the SEP header data 134. The SEP also copies the SCSI buffer descriptor 133 to a second STREAM buffer descriptor 138, resulting in the second STREAM buffer descriptor having the memory address and length of the 4K buffer 132. The STREAM SID 124 is then passed to the STP layer.

The STP layer then utilizes the STREAM SID to create NIC SIDs 126, 128, and 130. The STP begins by creating a main STP header data 140 in memory that will later be used by the transport layer to ensure that all sent bytes arrive at the target in the proper order. Next, the STP creates the header portion and buffer descriptors of the main NIC SID 126. The first NIC SID is called the main NIC SID because it incorporates the SEP header data 134, which is generally not present in subsequent NIC SIDs used to transmit the same buffer data. The STP provides a first NIC buffer descriptor 142 with the memory address and length of the main STP header data 140. The STP also copies the first STREAM buffer descriptor 136 to a second NIC buffer descriptor 144, resulting in the second NIC buffer descriptor having the memory address and length of the SEP header data 134.

Since a 4K buffer is typically too large to transmit as a single packet on most network systems, the STP breaks up the 4K buffer 132 into smaller "chunks" of data for network transfer. These chunks of data are then copied into data packets, sent across the network, and reassembled by the target machine.

For example, an Ethernet network is limited to sending data packets having a size of about 1.44K or less. Thus, to send the 4K buffer data 132 over an Ethernet network, the STP would divide the 4K buffer into three data chucks: first data chunk 148, second data chunk 150, and third data chunk 152.

Thus, the STP modifies the second STREAM buffer descriptor 138 to create a third NIC buffer descriptor 146, resulting in a modified version of the 4K buffer pointers 133, and 138. The modification includes assigning the memory address portion of the STREAM buffer descriptor 138 to the third NIC buffer descriptor 146. In addition, the STP sets the buffer length of the third NIC buffer descriptor 146 to the size of the data chunks that the 4K buffer was divided into, in the present example the buffer length of the third buffer descriptor 146 would be set at about 1.44K. Thus the third NIC buffer descriptor of the main NIC SID 126 includes the starting memory address of the 4K buffer 132, which is also the starting address of the first data chuck 148. In addition, the third NIC buffer descriptor 146 of the main NIC SID 126 includes a buffer length equal to the size of data chunk 148.

If further data remains to be referenced in the 4K buffer after creation of the main NIC SID 126 the STP generates additional NIC SIDs. In the present example, the STP creates a second NIC SID 128. Similar to the main NIC SID 126, in creating the second NIC SID 128 the STP creates a second STP header data 154 in memory. The STP then creates the header portion and buffer descriptors of the second NIC SID 128. The STP provides a first NIC buffer descriptor 156 of the second NIC SID 128 with the memory address and length of the second STP header data 154. In addition, the STP assigns a second NIC buffer descriptor 158 with a memory address of the second data chunk 150. The memory address of the second data chunk 150 is typically the same as the memory address of the first data chunk 148 offset by the size of the first data chunk 148, in this case 1.44K. In addition, the STP sets the buffer length of the second NIC buffer descriptor 158 of the second NIC SID 128 at the size of the second data chunk 150, in this case 1.44K. Thus the second NIC buffer descriptor 158 of the second NIC SID 128 includes the starting memory address of the second data chunk 150, and a buffer length equal to the size of second data chunk 150.

Since further data still remains to be referenced in the 4K buffer 132, the STP generates a third NIC SID 130. The third NIC SID 130 is created in a similar way as the second NIC SID 128. Thus, the third NIC SID 130 includes a header portion, a first buffer descriptor 160 having the memory address and length of a third STP header data 162. In addition, the third NIC SID 130 includes a second buffer descriptor 164 having a memory address of the third data chunk 152, and a buffer length equal to the size of the third data chunk 152. It should be borne in mind that since only 1.12K of data remains to be referenced in the 4K buffer 132, the buffer length of the second buffer descriptor 164 of the third NIC SID 130 will only be about 1.12K in the present example. After the NIC SIDs are created, they are transmitted via the network to the target machine.

Figure 5:
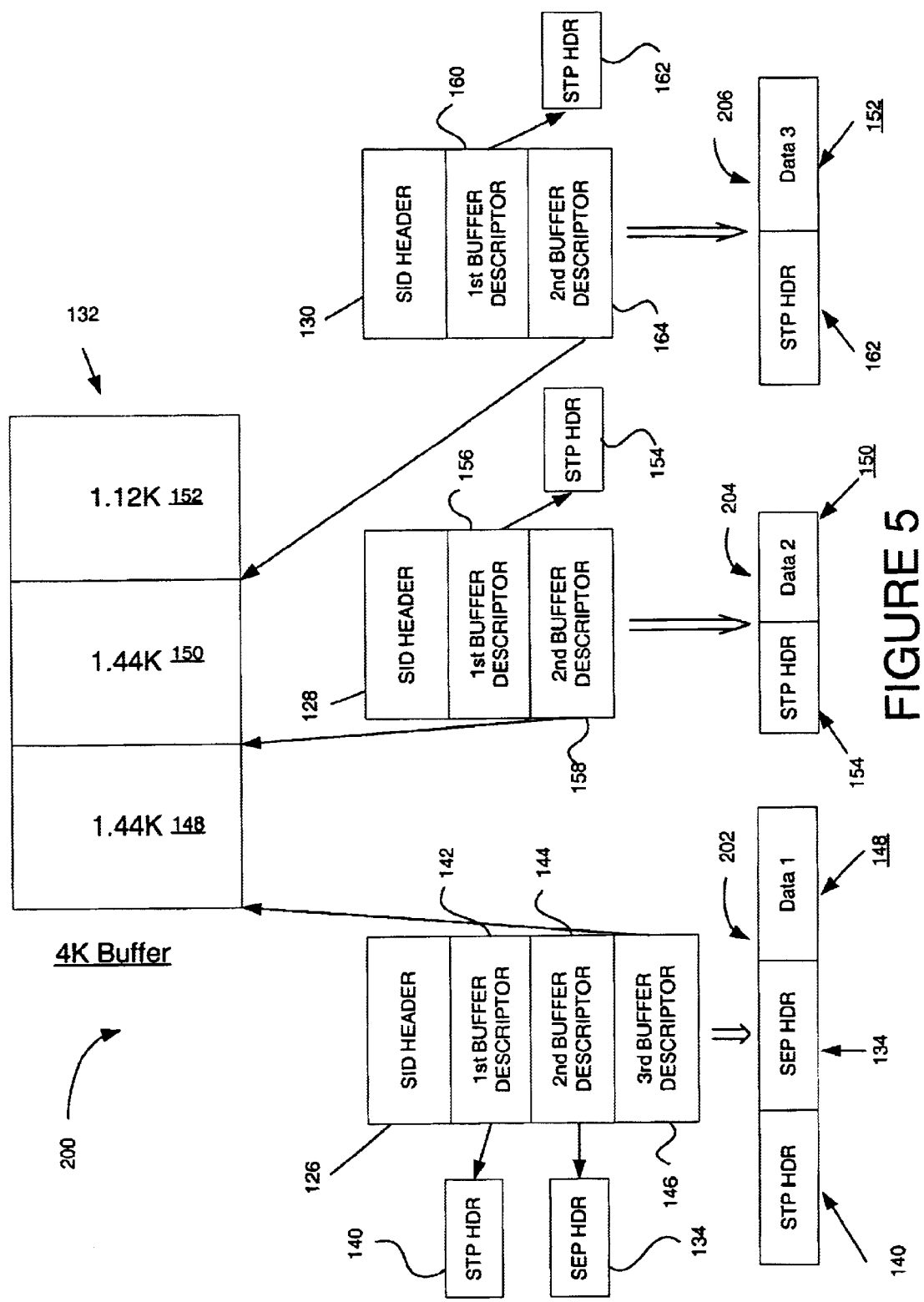
FIG. 5 is a block diagram showing an exemplary SID to packet flow for transmitting data in a network environment, in accordance with an embodiment of the present invention.

FIG. 5 is a block diagram showing an exemplary SID to packet flow 200 for transmitting data in a network environment, in accordance with an embodiment of the present invention. Once the NIC SIDs are created, they are passed to the NIC Driver layer for data packet creation. As shown in FIG. 5, the NIC driver utilizes the NIC SIDs 126, 128, and 130 to create a main data packet 202, a second data packet 204, and a third data packet 206.

The main data packet 202 includes a main STP header 140, an SEP header 134, and a first data chunk 148. To obtain these values, the NIC driver uses NIC SID 126 to find the required data in system memory. Specifically, the NIC driver obtains the address of the main STP header 140 from the first buffer descriptor 144 in the main NIC SID 126. This address is then used by the NIC driver to copy the STP header data 140 from system memory a local buffer on the NIC, which is used to send the data over the network wire. In an alternate embodiment, no local buffer is used, and the STP header data is copied directly to the network wire. Similarly, the NIC driver copies the SEP header 134 from system memory using the second buffer descriptor 144. Finally, the NIC copies the first data chunk 148 from the 4K buffer 132 to the local buffer. Thereafter, the entire main data packet 202 is transmitted over the network to the target.

In a similar manner, the NIC driver creates the second 204 and third 206 data packets utilizing the second and third NIC SIDs 128 and 130, which are then also transmitted over the network to the target. However, unlike the main data packet 202, the remaining data packets generally do not include an SEP header, since the SEP header has already been transmitted in the main data packet 202. In this manner, the contents of the 4K buffer 132 can be transmitted over the network in manner that uses substantially less data copying than is used in conventional network applications.

Figure 6:
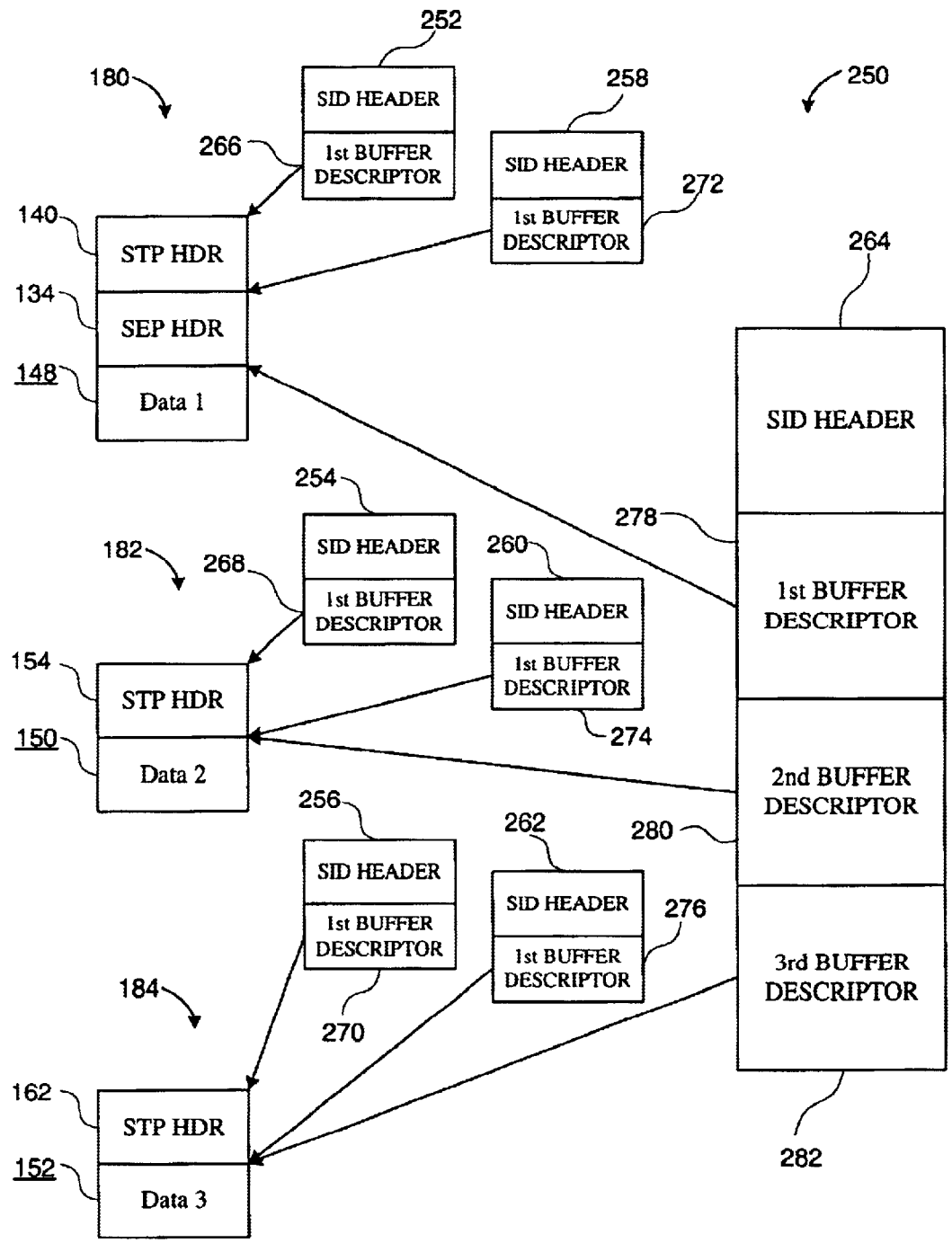
FIG. 6 is a block diagram showing an exemplary SID flow for receiving data in a network environment, in accordance with an embodiment of the present invention.

FIG. 6 is a block diagram showing an exemplary SID flow 250 for receiving data in a network environment, in accordance with an embodiment of the present invention. The SID flow 250 includes a first NIC SID 252, a second NIC SID 254, a third NIC SID 256, a main STREAM SID 258, a second STREAM SID 260, a third STREAM SID 262, and an OSM SCSI SID 264.

Continuing with the example above, as each data packet arrives at the target, the target NIC driver copies it into a packet buffer. In the present example, when main data packet arrives at the target, the target NIC driver copies the data into a first packet buffer 180. In a similar manner, the NIC driver copies the second and third data packets into a second packet buffer 182 and third packet buffer 184 as they arrive at the target.

It should be borne in mind that at this point the NIC driver typically does not know the contents of the data packets. The NIC driver generally only knows that a data packet has arrived and needs to be stored in a packet buffer. After copying the data packets into packet buffers, the NIC driver creates a NIC SID for each packet buffer. Specifically, the NIC driver creates the first NIC SID 252 by generating a header portion and a buffer descriptor 266 that includes the memory address of the first packet buffer 180, and a buffer length variable defining the size of the first packet buffer 180. In a similar manner, the NIC driver creates the second NIC SID 254 including a buffer descriptor 268 having the memory address and buffer size of the second packet buffer 182. Finally, the NIC driver creates the third NIC SID 256 having a buffer descriptor 270 with the memory address and buffer size of the third packet buffer 184. Having created the packet buffers and NIC SIDs, the NIC driver then passes the NIC SIDs to the STP for further processing. The STP utilizes the NIC SIDs created by the NIC driver to create STREAM SIDs.

Continuing with the above example, the STP examines the first NIC SID 252 to determine its destination. Using the buffer descriptor 266 of the first NIC SID 252, the STP examines the main STP header 140. Since this data packet is destined for this particular target in the present example, the STP creates the header portion and buffer descriptor 272 of a main STREAM SID 258. The STP modifies the memory address included in the buffer descriptor 266 of the first NIC SID 252 to skip the STP header data 140 and point to the SEP header data 134 in the first packet buffer 180. In addition, the buffer length of the NIC SID 252 buffer descriptor 266 is modified to be the size of the first packet buffer 180 reduced by the size of the STP header data 140. In other words, the new buffer length is the sum of the size of the SEP header data 134 and the first data chunk 148. The modified NIC SID 252 buffer descriptor 266 is then copied to the buffer descriptor 272 of the main STREAM SID 258.

In a like manner, the STP creates the second STREAM SID 260 after determining that the second packet buffer 182 is also destined for this target. The STP creates the header portion and buffer descriptor 274 of a second STREAM SID 258 by modifying the buffer descriptor 268 of the second NIC SID 254. In particular, the STP modifies the memory address included in the second NIC SID 254 buffer descriptor 268 to point to the memory address of the second data chunk 150, and assigns this value to the buffer descriptor 274 of the second STREAM SID 260. The STP also modifies the buffer length of the second NIC SID 254 buffer descriptor 268 to be the length of the second packet buffer 182 reduced by the size of the second STP header data 154. Essentially, the buffer length will be the size of the second data chunk 150, since the second data chunk 150 is all that remains in the second packet buffer after the second STP header data 154 is skipped. The modified buffer length is then assigned to the buffer descriptor 274 of the second STREAM SID 260.

Similar to the second STREAM SID 260, the STP generates the third STREAM SID 262. The third STREAM SID 262 includes a header portion and a buffer descriptor 276. Specifically, the buffer descriptor 276 of the third STREAM SID 262 includes the memory address of the third data chunk 152 in the third packet buffer 184. In addition, the STREAM SID 262 buffer descriptor 276 includes a buffer length variable set to the size of the third chunk of data 152. As each STREAM SID is created it is passed up to the SEP layer for further processing.

The SEP uses the STREAM SIDs generated by the STP to categorize the data packets. By utilizing the STREAM SIDs, the SEP creates an OSM SCSI SID that enables the SCSI target layer to reassemble the received data back into the same order as it was originally in the 4K buffer on the transmitting host machine.

In particular, the SEP uses the buffer descriptor 272 of the main STREAM SID 258 to obtain the SEP header data 134. The SEP header data 134 enables the SEP to categorize all the data packets that are part of the same transmission from the sending host. As described in greater detail subsequently, the STP layers on the host and target establish a virtual connection (VC) for each data transmission, thus enabling the target SEP to categorize all the data packets for that transmission, as they are received at the target, into SCSI commands, status, and data.

The SEP then begins creating the OSM SCSI SID 264 by modifying the buffer descriptor 272 of the main STREAM SID 258 to point to the first data chunk 148 in the first packet buffer 180, and assigns this value to a first buffer descriptor 278 in the OSM SCSI SID 264. In addition, the buffer length of the STREAM SID 258 buffer descriptor 272 is modified to be the length of the first packet buffer 180 reduced by the size of the STP header data 140 and the SEP header data 134. In other words, the buffer length is equal to the size of the first data chunk 148, since it is all that remains in the first packet buffer 180 after the STP header data 140 and the SEP header data 134 are skipped.

The OSM SCSI SID 264 includes as many buffer descriptors as there are data packets for the related transmission. After receiving and analyzing the SEP header data 134 for a particular transmission, the SEP recognizes received data packets related to the same transmission as each additional related STREAM SID is passed to the SEP. The SEP then continues to update the OSM SCSI SID as each data packet arrives.

In the present example, when the STP passes the second STREAM SID 260 to the SEP, the SEP copies the buffer descriptor 274 of the second STREAM SID 260 to a second buffer descriptor 280 of the OSM SCSI SID 264. Similarly, when the STP passes the third STREAM SID 262 to the SEP, the SEP copies the buffer descriptor 276 of the third STREAM SID 262 to a third buffer descriptor 282 of the OSM SCSI SID 264.

Having received all the expected STREAM SIDs for the current transmission, the SEP recognizes that all the expected data packets have arrived at the target. At this point the SEP passes the OSM SCSI SID 264 to the SCSI target layer, which generates a target buffer having a size equal to the sum of the all the buffer lengths in the buffer descriptors 278, 280, and 282 of the OSM SCSI SID 264. In one embodiment, the SCSI target software copies the data chunks 148, 150, and 152 from the packet buffers 180, 182, and 184 to the target buffer, utilizing the buffer descriptors 278, 280, and 282 of the OSM SCSI SID 264. However, in other embodiments, the copying operation may be skipped. A pointer to the target buffer is then passed to the operating system for further processing of the data. In this manner, disassembled data from the network can be reassembled at the target with substantially less data copying than in conventional network systems.

Figure 7:
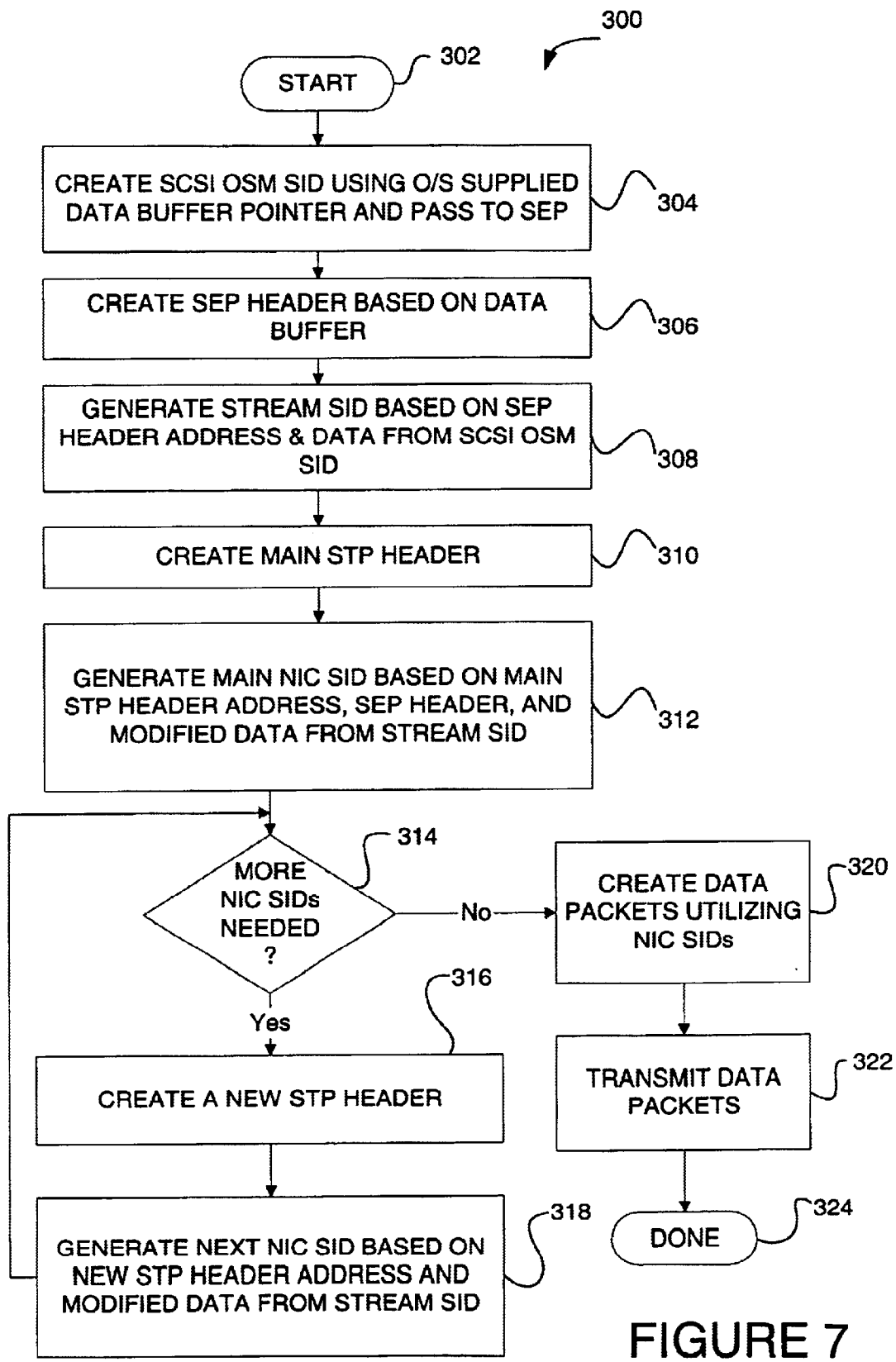
FIG. 7 is a flowchart showing a process for transmitting data in a network environment using a SID interface, in accordance with an embodiment of the present invention.

FIG. 7 is a flowchart showing a process 300 for transmitting data in a network environment using a SID interface, in accordance with an embodiment of the present invention. In an initial operation 302, pre-process operations are performed. Pre-process operations include obtaining a pointer or list of pointers from the operating system addressing data to be transported over the network. The data may be located in one buffer or a plurality of buffers, in which case a link list of pointers to the buffers is generally created. Other pre-process operations will be apparent to those skilled in the art.

In a SCSI OSM SID creation operation 304, the SCSI layer software creates a SCSI OSM SID. Generally, a SCSI layer program is called with an operating system defined pointer list having a memory address pointer pointing to the beginning of a data buffer. The SCSI layer software then copies the pointer into the SCSI OSM SID and updates the SCSI OSM SID to include a SCSI header portion and a SCSI buffer descriptor having the memory address of the beginning of the buffer. In addition, the SCSI buffer descriptor includes a buffer length variable set to the size of the data buffer. The SCSI OSM SID is then passed to the SEP layer.

The SEP then utilizes the SCSI OSM SID to create SEP header data in memory, in an SEP header operation 306. The SEP header data will later be used by the target machine to identify the segments of the sent data, associate commands with their data, and provide flow control between the host data buffers and the target data buffers.

Next, in a STREAM SID creation operation 308, the SEP creates the header portion and buffer descriptors of a STREAM SID. A first STREAM buffer descriptor is provided with the memory address and length of the SEP header data created in SEP header operation 30,6. The SEP also copies the SCSI buffer descriptor to a second STREAM buffer descriptor, resulting in the second STREAM buffer descriptor having the memory address and length of the data buffer. The STREAM SID is then passed to the STP layer.

The STP layer then utilizes the STREAM SID to create a main STP header data in memory, in main STP header operation 310. The transport layer later uses the main STP header data to ensure that all sent bytes arrive at the target in the proper order.

In a main NIC SID creation operation 312, the STP creates the header portion and buffer descriptors of a main NIC SID. The first NIC SID is called the main NIC SID because it incorporates the SEP header data, which is generally not present in subsequent NIC SIDs used to transmit the same buffer data. The STP provides a first NIC buffer descriptor with the memory address and length of the main STP header data. In addition, the STP copies the first STREAM buffer descriptor to a second NIC buffer descriptor, resulting the second NIC buffer descriptor having the memory address and length of the SEP header data.

As stated previously, a data buffer may be too large to transmit as a single packet the network systems. Hence, if the data buffer is too large to transmit as a single data packet, the STP breaks up the buffer into smaller "chunks" of data for network transfer. These chunks of data are then copied into data packets, sent across the network, and reassembled by the target machine.

For example, an Ethernet network is limited to sending data packets having a size of about 1.44K or less. Thus, to send a 4K buffer data over an Ethernet network, the STP would divide the 4K buffer into three chucks, a first data chunk of about 1.44K, a second data chunk of about 1.44K, and a third data chunk of about 1.12K.

Thus, the STP modifies the second STREAM buffer descriptor to create a third NIC buffer descriptor. The modification includes assigning the memory address portion of the STREAM buffer descriptor to the third NIC buffer descriptor. In addition, the STP sets the buffer length of the third NIC buffer descriptor at the size of the data chunks that the data buffer was divided into if the data buffer was too large to transfer in a single data packet. For example the buffer length of the third buffer descriptor would be set at about 1.44K if a 4K buffer was being sent over an Ethernet network. Thus the third NIC buffer descriptor of the main NIC SID includes the starting memory address of the data buffer, which is also the starting address of the first data chuck. In addition, the third NIC buffer descriptor of the main NIC SID includes a buffer length equal to the size of data chunk, or the size of the entire data buffer if it is small enough to transmit over the network in a single data packet.

A decision is then made as to whether additional NIC SIDs are needed for the current transmission, in operation 314. If the data buffer is too large to transmit in a single data packet, additional NIC SIDs are generated for each data chunk the data buffer is divided into. For example, a 4K buffer would be divided into three data chunks for transport over an Ethernet network, since the Ethernet maximum data packet size is about 1.44K. In this case, in addition to the main NIC SID created in the main NIC SID creation operation 312, two additional NIC SIDs would be created.

Thus, if additional SIDs are needed, the process 300 continues with a new STP header operation 316. Otherwise, the process 300 continues with a data packet creation operation 320.

If further data remains to be referenced in the data buffer after creation of the main NIC SID the STP generates an additional STP header, in new STP header operation 316. Similar to the main NIC SID, the STP creates a new STP header data in memory.

In a NIC SID creation operation 318, the STP creates the header portion and buffer descriptors of a new NIC SID. The STP provides a first NIC buffer descriptor of the new NIC SID with the memory address and length of the new STP header data. In addition, the STP assigns a second NIC buffer descriptor a memory address of the next data chunk to be referenced in the data buffer. The memory address of the next data chunk is typically the same as the memory address of the previous data chunk offset by the size of the previous data chunk. In addition, the STP sets the buffer length variable of the second NIC buffer descriptor to the size of the next data chunk. Thus the third NIC buffer descriptor of the new NIC SID includes the starting memory address of the next data chunk to be referenced, and a buffer length equal to the size of that data chunk. The process 300 then continues with another NIC SID check, in operation 314.

Once the NIC SIDs are generated, the NIC driver uses the NIC SIDs to create individual data packets for each NIC SID, in a data packet creation operation 320. The NIC driver first creates a main data packet, which includes a main STP header, an SEP header, and a first data chunk. To obtain these values, the NIC driver uses the main NIC SID to find the required data in system memory. Specifically, the NIC driver obtains the address of the main STP header from the first buffer descriptor in the main NIC SID. This address is then used by the NIC driver to copy the STP header data from system memory a local buffer on the NIC. In an alternate embodiment, no local buffer is used, and the STP header data is copied directly to the network wire. Similarly, the NIC driver copies the SEP header from system memory using the second buffer descriptor. Finally, the NIC copies the first data chunk from the data buffer to the local buffer.

In a similar manner, the NIC driver creates additional data packets utilizing the other related NIC SIDs. However, unlike the main data packet, the remaining data packets do not include an SEP header, since the SEP header has already been transmitted in the main data packet.

Thereafter, the data packets are transmitted over the network to the target, in a transmission operation 322. In this manner, the contents of the data buffer can be transmitted over the network in manner that uses substantially less data copying than is used in conventional network applications.

Post-process operations are then performed in a final transmission operation 324. Post-process operations include obtaining an acknowledgment signal from the target indicating proper receipt of the data packets, and returning of the generated SIDs to respective free SID pools.

Figure 8:
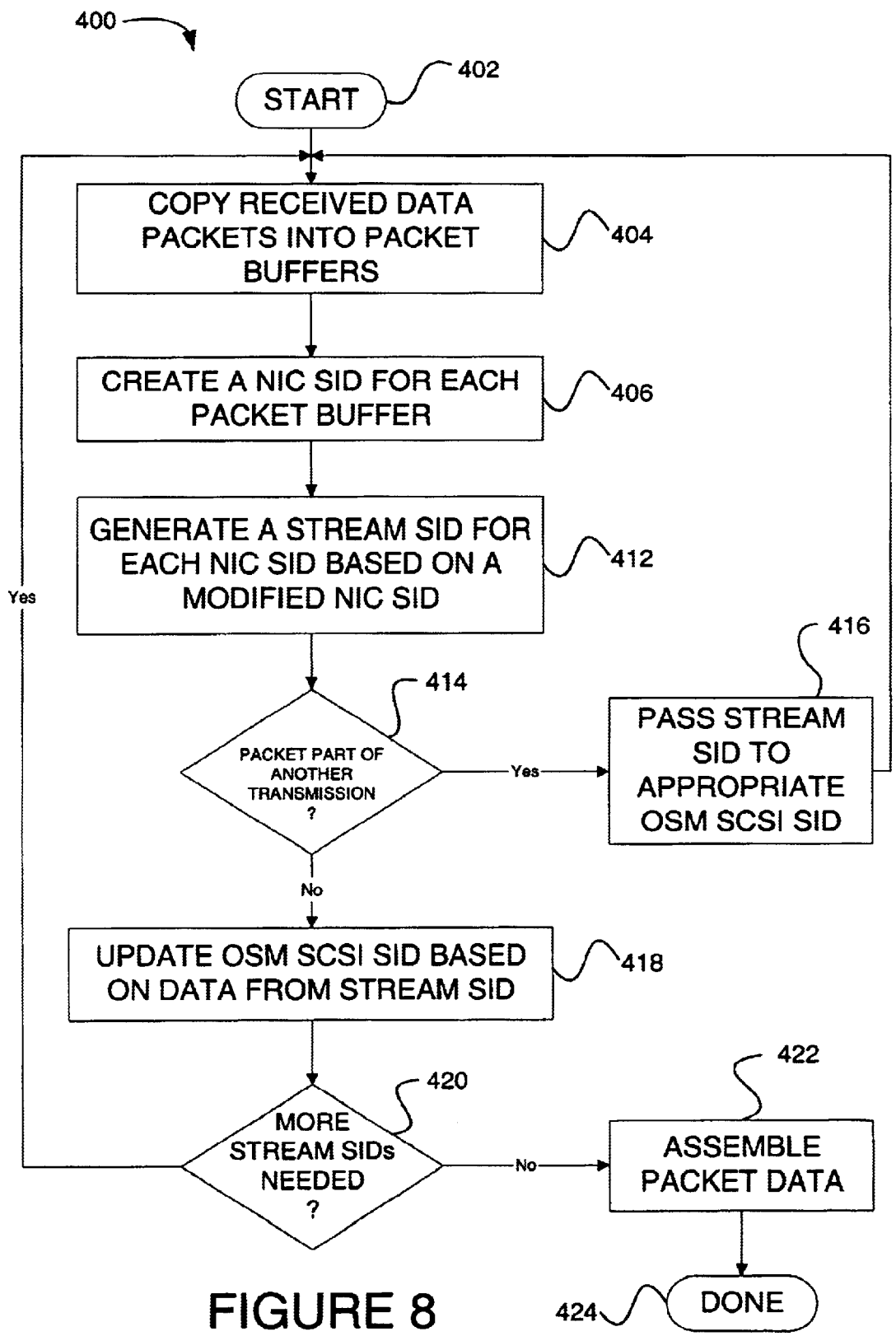
FIG. 8 is a flow chart showing a process for receiving data via network utilizing a SID layer interface, in accordance with an embodiment of the present invention.

FIG. 8 is a flow chart showing a process 400 for receiving data via network utilizing a SID layer interface, in accordance with an embodiment of the present invention. In an initial operation 402 pre-process operations are performed. Pre-process operations include creating SID pools and other pre-process operations that will be apparent to those skilled in the art.

In packet buffer operation 404, received data packets are copied into packet buffers. As each data packet arrives at the target, the target NIC driver copies the data packet into a packet buffer. As described above, at this point the NIC driver typically does not know the contents of the data packets. The NIC driver generally only knows that a data packet has arrived and needs to be stored in a packet buffer.

After copying the data packets into packet buffers, the NIC driver creates a NIC SID for each packet buffer, in a NIC SID generation operation 406. Specifically, the NIC driver creates each NIC SID by generating a header portion and a buffer descriptor that includes the memory address of the related packet buffer, and a buffer length variable defining the size of the related packet buffer. In a similar manner, the NIC driver creates additional NIC SIDs as needed for additional packet buffers. Having created the packet buffers and NIC SIDs, the NIC driver then passes the NIC SIDs to the STP for further processing.

In the STREAM SID creation operation 412, the STP creates a STREAM SID for each NIC SID related to a data packet destined for this particular target. Using the buffer descriptor of the each NIC SID, the STP examines the STP header in the packet buffer. If the data packet is destined for this particular target, the STP creates the header portion and buffer descriptor of a STREAM SID. For the first NIC SID examined in a particular transmission, the STP modifies the memory address included in the buffer descriptor of the NIC SID to skip the STP header data and point to the SEP header data in the packet buffer. In addition, the buffer length of the NIC SID buffer descriptor is modified to be the size of the packet buffer reduced by the size of the STP header data. In other words, the new buffer length is the sum of the size of the SEP header data and the data chunk in the packet buffer. The modified NIC SID buffer descriptor is then copied to the buffer descriptor of the STREAM SID.

For subsequent data packets in a particular transmission, the STP creates a STREAM SID in a similar manner. The STP creates the header portion and buffer descriptor of subsequent STREAM SIDs by modifying the buffer descriptor of the appropriate NIC SID. In particular, the STP modifies the memory address included in the NIC SID buffer descriptor to point to the memory address of the data chunk in the related packet buffer, and assigns this value to the buffer descriptor of the subsequent STREAM SID. The STP then modifies the buffer length of the NIC SID buffer descriptor to be the length of the packet buffer reduced by the size of the second STP header data. Essentially, the buffer length will be the size of the data chunk in the related packet buffer, since the data chunk is all that remains in the packet buffer after the STP header data is skipped. The modified buffer length is then assigned to the buffer descriptor of the subsequent STREAM SID. The STREAM SIDs are then passed up to SEP layer as they are created.

As each of the STREAM SIDs is passed the SEP, a determination is made as to whether the particular STREAM SID is Part of another transmission, or VC, in operation 414. STREAM SIDs that are part of another existing VC are passed to the appropriate OSM SCSI SID for further processing, in operation 416. STREAM SIDs that are new or part of this particular VC are used to update a OSM SCSI SID, in a OSM SCSI SID updating operation 418.

The STREAM SIDs generated by the STP are used to categorize the data packets and the OSM SCSI SID is updated in operation 418. By utilizing the STREAM SIDs, an OSM SCSI SID is created that enables the SCSI target layer to receive the data in the same order as it was originally in the data buffer on the transmitting host machine.

In particular, the SEP uses the buffer descriptor of the first STREAM SID in a particular VC to obtain the SEP header data in the related packet buffer. The SEP header data enables the SEP to categorize all the data packets that are part of the same transmission from the sending host. The STP layers on the host and target establish a VC for each data transmission, thus enabling the target SEP to categorize all the data packets for that transmission into SCSI commands, status, and data.

The SEP then begins creating the OSM SCSI SID by modifying the buffer descriptor of the each received STREAM SID to point to the data chunk in the related packet buffer, and assigns this value to a buffer descriptor in the OSM SCSI SID. In addition, the buffer length of the STREAM SID buffer descriptor is modified to be the length of the related packet buffer reduced by the size of the STP header data and the SEP header data, if this is the first STP of a particular VC, or by the STP header data, if this a subsequent STREAM SID in a particular VC. In other words, the buffer length is equal to the size of the related data chunk, since it is all that remains in the related packet buffer after any header data is skipped.

A decision is then made as to whether more STREAM SIDs are needed for the current VC, in operation 420. The OSM SCSI SID includes as many buffer descriptors as there are data packets for the related transmission, or VC. After receiving and analyzing the SEP header data for a particular transmission, the SEP recognizes received data packets related to the same transmission as each additional related STREAM SID is passed to the SEP. The SEP then continues to update the OSM SCSI SID as each data packet arrives. Thus, if additional STREAM SIDs are needed for the current transmission, the process 400 continues receiving data packets, storing them in packet buffers, and analyzing them until all the STREAM SIDs have been received for the particular transmission. When no additional STREAM SIDs are required, the OSM SCSI SID includes buffer descriptors pointing to all the data required to reassemble the original data buffer on the target.

In an assembling operation 422, the SCSI target layer assembles the packet data using the OSM SCSI SID. Having received all the expected STREAM SIDs for the current transmission, the SEP recognizes that all the expected data packets have arrived at the target. At this point the SEP passes the OSM SCSI SID to the SCSI target layer, which, in one embodiment, generates a target buffer having a size equal to the sum of the all the buffer lengths in the buffer descriptors of the OSM SCSI SID. The SCSI target software then copies the data chunks from the packet buffers to the target buffer, utilizing the buffer descriptors of the OSM SCSI SID. In another embodiment, the data is transferred directly from the data packet memory using a Direct Memory Access (DMA) process, thus avoiding any copying.

Post-process operations are then performed in a final operation 424. Post-process operations include passing a target buffer pointer to the operating system for further processing of the data. In this manner, disassembled data from the network can be reassembled at the target with substantially less data copying than in conventional network systems. Having explained the present invention in broad terms with respect to SIDs, an embodiment specific to an Ethernet network will now be described.

In the present invention, the SCSI, SEP and Transport layers have collections of state for individual devices or end to end sessions in order to manage the multiple concurrent transactions. The examples provided thus far with respect to FIGS. 4–8 have been simplified to show one session, spanning the SCSI, SEP and Transport layers, for each device in order to illustrate the SID interface. However, as FIG. 9 illustrates, the session relationships can be much more complicated, for example if one session is allowed to connect to multiple devices on a logicial unit (LUN) bridge.

Preferably, open SIDs are used to create SEP sessions and STP or TCP connections, as described in greater detail subsequently. In one embodiment, once a session and connection is made, it is bound to a SCSI LUN with a Connect and Negotiate SID and corresponding SEP command. In an alternative embodiment, a single session can be connected to multiple LUNs on the same bridge.

Figure 9:
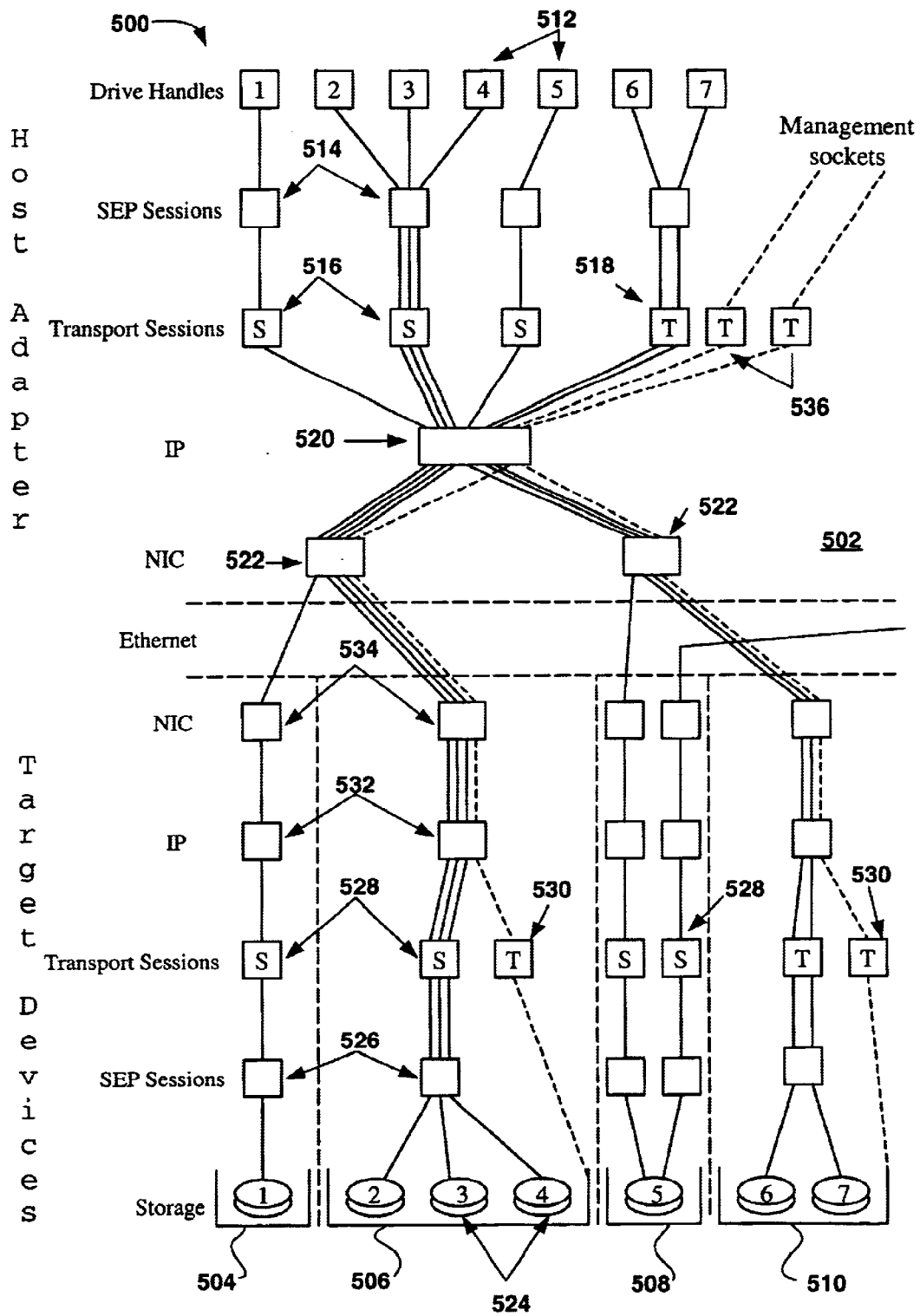
FIG. 9 is a logical unit (LUN) connectivity diagram showing an exemplary EtherStorage configuration.

FIG. 9 is a connectivity diagram showing an exemplary Etherstorage configuration 500, in accordance with an embodiment of the present invention. The Etherstorage configuration 500 includes a host 502 and four targets 504, 506, 508, and 510. The host 502 includes drive handles 512, host SEP sessions 514, host STP transport sessions 516, host TCP transport sessions 518, host IP layer 520, and host NIC drivers 522.

Each target 504, 506, 508, and 510 includes logical units (LUNs) 524, target SEP sessions 526, target STP transport sessions 528, target TCP transport sessions 530, target IP layer 532, and target NIC drivers 534.

As shown in FIG. 9, there are seven logical units 524 in four separate targets 504, 506, 508, and 510, all connected to one host 502, while the logical unit 524 of target 508 is connected to a second host as well (not shown). The logical units 524 of targets 504 and 508 are single EtherStorage drives, while the LUNs 524 of target 506 are in one LUN bridge and the LUNs 524 of target 510 are in a second LUN bridge. FIG. 9 shows that the SEP of the present invention can have multiple LUNs 524 connected through a single SEP session 526, so four total SEP sessions 514 are required to the illustrated host 502. Each host SEP session 514 has an associated Transport Session 516, 518 (also called connection), three of which are STP 516 and one of which is TCP 518. In addition, two TCP connections 536 are shown for LUN bridge management.

FIG. 9 illustrates how LUNs 524 are multiplexed to SEP sessions 514, 526, which are in turn multiplexed on the Ethernet through STP and TCP connections. The routing and multiplexing is accomplished through SID handles within the firmware, which are created by an Open SID and carried by other SIDs in the r_identifyier field of the h_RecipientReserved field, as described in greater detail subsequently. As part of the opening processes, sessions at each layer swap handles, which are saved for future use. The handles identify which session or unit the SID is destined for.

In use, handles function as indexes into each session's state tables, so they can be used directly to index into the particular session. A typical sequence starts with a SCSI request arriving at a drive handle 512 within the host 502. Each drive handle 512 has an associated unit and SEP session handle, which is placed in a SCSI SID and passed to SEP. The unit handle allows multiple LlJNs 524 to share one target SEP session 526. The SEP produces a SEP header incorporating the unit handle, and obtains the host SEP session's 516 saved STP or TCP handle to access the transport layer. Assuming STP, the host STP session 514 builds a STP header that includes the STP handle required to access the appropriate target STP session 528 on the target 504, 506, 508, or 510. The host STP session 516 then sends a SID including a handle for the appropriate host NIC driver 522, which then sends the entire package to the target device 504, 506, 508, or 510.

At the target 504, 506, 508, or 510, the target NIC driver 534 passes data to the target IP layer 532, which routes the packets to either STP or TCP. Again, assuming STP, the target STP layer uses the STP session handle to access the state for that STP connection 528, then passes the data portion to the SEP layer using the saved SEP session handle that corresponds to the target STP session 528 (connection). The SEP then extracts the UNIT handle and uses it to forward the SCSI request to the appropriate LUN 524. A similar sequence happens when returning data.

From the above description, it might seem that having separate SEP and STP handles is not necessary. However, there is not a one to one correspondence between SEP and STP, since the SEP could also be used over TCP, and because some other session layer, such as VI might also be talking to STP sessions. For example, if SEP session A talks to STP session A, but SEP session B talks to TCP session A, then SEP session C will be taking to STP session B. Hence the need for separate handles across each interface.

Communication between each network stack layer in EtherStorage is done through SIDs, which share a common header. The common header includes fields that allow queuing by both the originator (initiator) of the SID and the receiver. In addition, queuing is allowed by pending returns when the recipient layer is unable to finish processing the SID. Thus, SIDs can always be accepted by a recipient layer, even when the local resources needed to process them are unavailable.

Figure 10A:
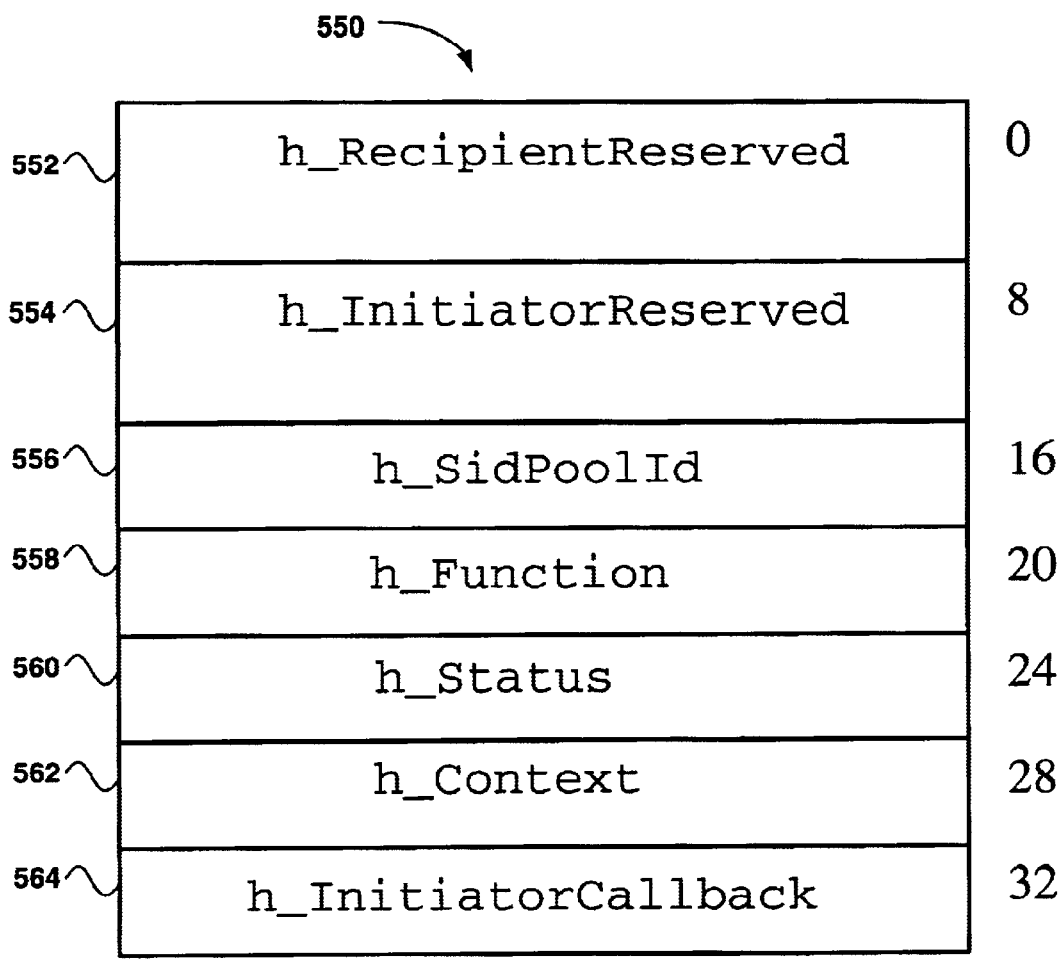
FIG. 10A is a block diagram showing an exemplary SID common header, in accordance with an embodiment of the present invention.

FIG. 10 is a block diagram showing an exemplary SID common header 550, in accordance with an embodiment of the present invention. The SID common header 550 includes seven fields, of which two are identical compositions of two sub-fields. The total size of the common SID header 550 is preferably thirty-six bytes.

Figure 10B:
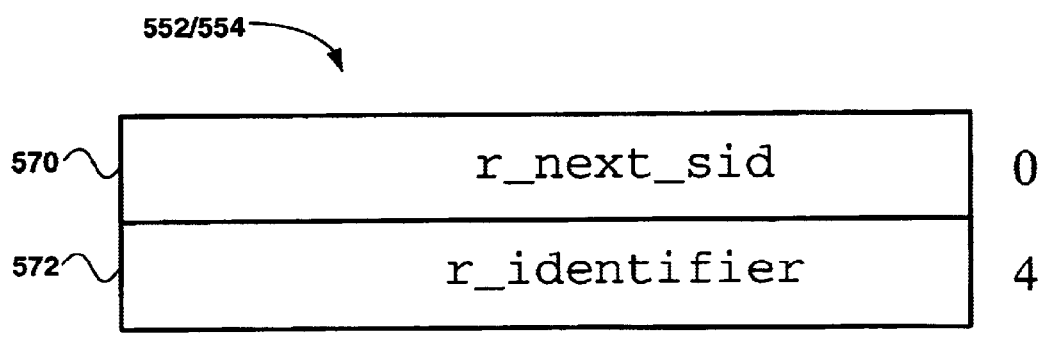
FIG. 10B is a block diagram showing sub-fields of composite reserved fields of an exemplary SID common header, in accordance with an embodiment of the present invention.

The two composite fields of the SID header are h_RecipientReserved 552, h_InitiatorReserved 554, and are shown in greater detail in FIG. 10B. FIG. 10B is block diagram showing the sub-fields of the composite fields 552/554 of the SID common header, in accordance with an embodiment of the present invention.

The composite reserved fields 552/554 each include a SID pointer 570 and a thirty-two bit unsigned integer 572. Essentially, the composite reserved fields 552/554 can be used to queue SIDs using the SID pointer 570 and associate SIDs with particular requests or sessions using the thirty-two bit field. In particular the r_identifier field 572 of h_InitiatorReserved is used to indicate to the called layer which session the SID is for. However, the exact use is at the discretion of the recipient or initiator (originator) respectively.

Referring back to FIG. 10A, h_SidPoolId 556 is a thirty-two bit unsigned integer serving as an identifier (e.g. index) indicating which SID pool the SID came from, so that common allocation/de-allocation code can be used. It should be borne in mind that h_SidPoolId 556 does not need to be thirty-two bits, but this allows its use as a pointer by some programmers, in which case it should be a PVOID type.

h_Function 558 indicates the type of SID, and specific function being performed by the SID. This is generally a thirty-two bit unsigned integer.

h_Status 560 is a value set on return of the SID. In one embodiment, h_Status 560 can be one of three values, SID_DONE, SID PENDING and SID_ERROR. Preferably, the field is of type SID_STATUS.

h_Context 562 allows multiple EtherStorge HBAs in one machine. h_Context 562 points to the state area used for the particular HBA and is preferably of type PVOID.

h_InitiatorCallback 564 is a pointer to routine in the originating layer which the receiving layer calls when a pending SID is finally finished. Preferably, this field is of type SID_CALLBACK *.

The functions encoded with h_Function are preferably mostly specific to each SID type. Generally, the function codes used encode the SID type as well as the function, thus the layer a SID is destined for can be determined by the upper bits of its function code. The functions implemented by each SID type will be described in greater detail subsequently as part of the discussion about each SID type. There are a few generic SIDs which are passed between all layers. Of these, SID_OPEN indicates to open a session, and SID_CLOSE indicates to close a session, discussed in greater detail below.

In order to fully describe the functions of the various Common SID Header fields, a SID will be followed through a typical usage pattern. First, a SID is fetched from one of several SID pools, with the h_SidPoolId set to the index of the SID pool so the SID is returned to that pool on completion. The r_identifyier field of the h_RecipientReserved field is then set to the handle of the called layer's session. Next, the h_Function field is set to indicate what action the recipient layer should perform. Further, since SIDs may return a SID_PENDING status, the h_InitiatorCallback field is filled with a pointer to an appropriate routine for the recipient layer to call when it has finally finished the action specified in the h_Function field.

The properly initialized SID is then sent to the recipient layer using either a call to the layer's XXX_Request routine if the SID is being sent to a lower layer, or using a call to its XXX_Indication routine if the SID is being sent to a higher layer. For example, STP calls NIC_Request to send packets down to the NIC, but calls SEP_Indication to send the contents of STP Packets up to the SEP layer. The prototypes for these two routines are shown below.

SID_STATUS NIC_Request(SID HEADER *);
SID_STATUS SEP_Indication(SID_HEADER *);

The Recipient layer may begin processing the packets immediately, or queue them (using the SID pointer field in h_RecipientReserved )for future processing. If the SID is processed immediately, the Recipient may be able to complete processing in some cases, returning SID_DONE, or detect an error condition, returning SID ERROR. If the SID is queued, or for some other reason processing must be suspended, the call returns SID_PENDING. While the SID contains a status field, the SID_STATUS returned by the call is used to determine success, pending or failure, since the SID's status field could be changed by the recipient before the initiator had a chance to examine it in a multi-threaded environment.

If the call to the recipient was returned with SID_PENDING, it is now up to the recipient to finish processing at some later time and return the SID with a call to the routine pointed to by the h_InitiatorCallback field. This callback call includes a pointer to the SID, hence the initiator can determine which SID is being returned. The r_identifier field of the h_InitiatorReserved field can be used by the initiator to store additional identifying information for use by the callback routine. The h_Status field will contain either SID_DONE or SID_ERROR. The prototype for this routine is as follows:

void STP_CallBack(SID_HEADER *);

In order to maintain correct operation in a multithreading environment, certain rules are preferably observed. First, after sending a SID to the recipient layer, the initiator layer can only change values in the h_InitiatorReserved fields. Second, the recipient layer does not change or examine any fields in h_InitiatorReserved after receiving a SID, though it may modify anything else in the SID (except the h_SidPoolID field). Third, if the recipient layer returns from the initial call with SID_DONE or SID_ERROR status, the SID is considered returned to the initiator layer, and the recipient can no longer modify any field in the SID.

In addition, if the recipient layer returns from the initial call with SID_PENDING, then the recipient is considered to still own the SID and may continue to modify and examine all fields but h_InitiatorReserved. Because the recipient layer may still modify the h_Status field if SID_PENDING was returned, the initiator preferably examines the returned value from the initial call to determine SID_STATUS.

After the recipient finally returns the SID with a call to the SID's callback routine, it may no longer modify or examine any fields in the SID. Conversely, the initiating layer can modify or examine any field of the SID, and should examine the h_Status field to determine success or failure. Further, the initiating layer performs further processing using fields from the SID after the return of the SID from the recipient layer, then returns the SID to the SID pool from whence it came. As previously stated, SIDs of the present invention generally include a common header portion, and a specific header portion. Specific SID header portions will now be described, beginning with Open and Close SID functions.

Figure 11A:
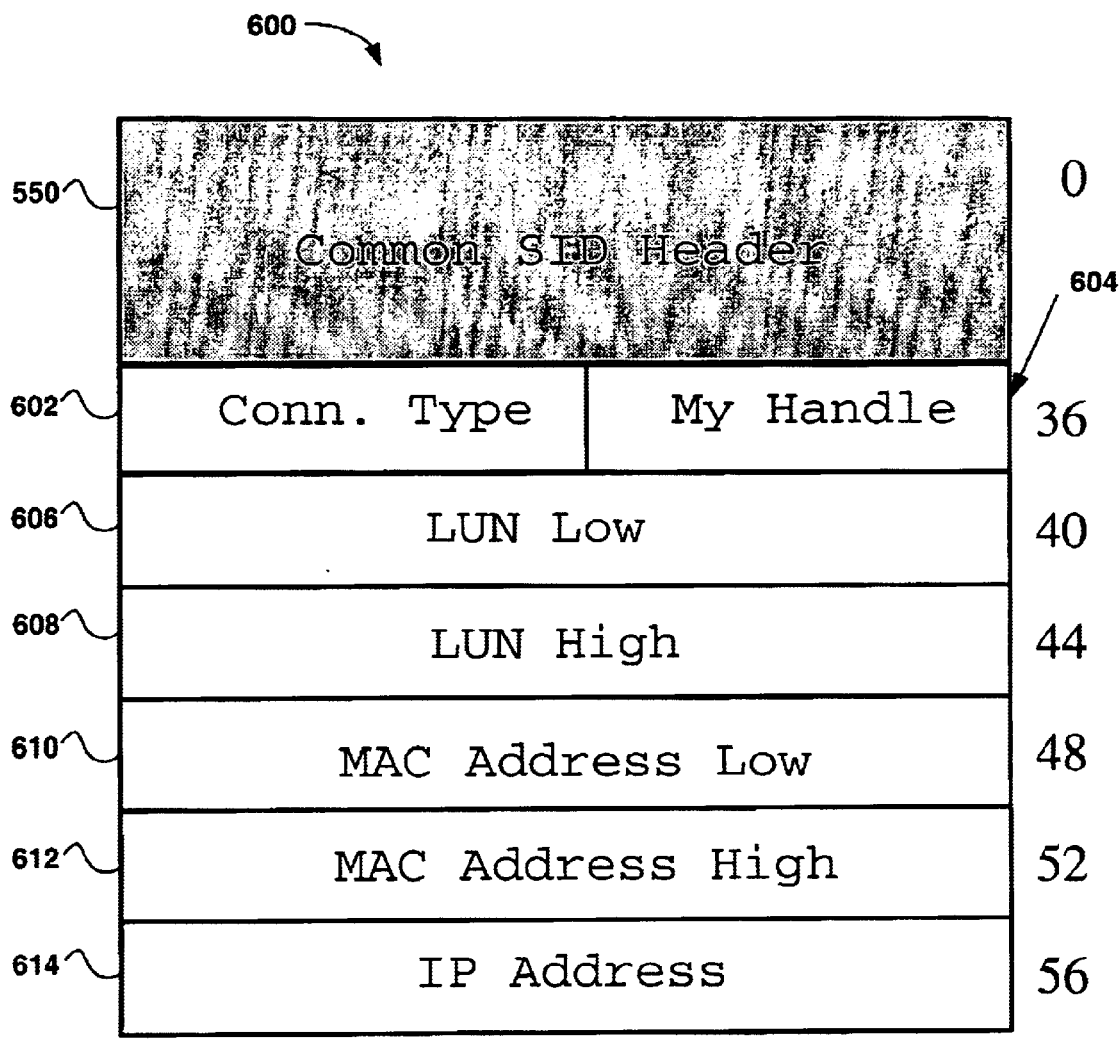
FIG. 11A is a block diagram showing the format of an Open SID, in accordance with an embodiment of the present invention.

The open and close SID functions are a generic pair which affect the SCSI, SEP and Transport layers. FIG. 11A is a block diagram showing the format of an Open SID 600, in accordance with an embodiment of the present invention. As with most SIDs, the Open SID 600 includes a common header 550, as described above with reference to FIGS. 10A and 10B. The specific portion of the Open SID header begins with Conn. Type 602, which is Connection Type. The Connection Type can be Stream, Datagram, STP/TCP and MAC/IPv4/IPv6 selection bits.

My Handle 604 is the handle that the Layer to which this SID was sent uses when sending other SIDs back to the originating Layer. When the Open SID 600 is returned to the originating layer, the r_identifyier field of the h_RecipientReserved field in the common header 550 portion will contain the handle that the originating layer uses to send future SIDs to the destination layer. The originating layer's handle remains in My Handle 604.

LUN Low 606 and High 608 are the eight byte SCSI LUN, if applicable. For sockets, this could be the source and destination socket numbers. MAC Address Low 610 and High 612 are the six byte MAC address. The first four bytes are in MAC Address Low 610, and the last two are in MAC Address High 612. This field and the IP address field can combined into a single, sixteen byte field in some embodiments. Finally, IP Address 614 is the four byte IP version 4 address. In another embodiment, IP Address 614 is replaced by a combined 16 byte field for MAC, IPv4 and IPv6 addresses.

Figure 11B:
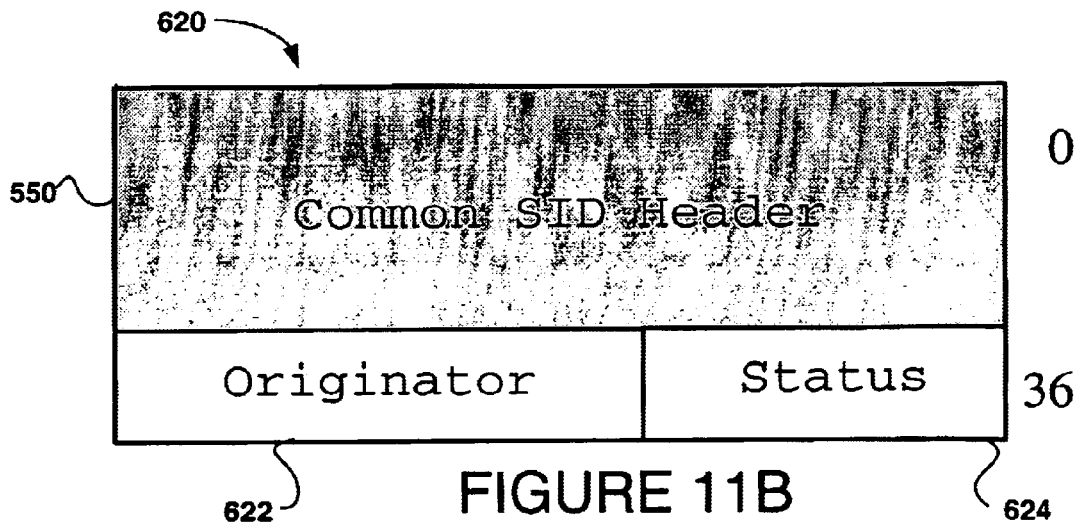
FIG. 11B is a block diagram showing the format of a Close SID, in accordance with an embodiment of the present invention.

FIG. 11B is a block diagram showing the format of a Close SID 620, in accordance with an embodiment of the present invention. Similar to the Open SID, the Close SID 620 includes a common header 550, as described above with reference to FIGS. 10A and 10B.

In addition, the Close SID 620 includes an Originator 622 that includes code indicating which layer and end (e.g. host SCSI or target STP) initiated the close, and a Status 624 that indicates the reason for the close. The handle placed in the Common SID Header preferably identifies the particular session being closed.

Figure 12:
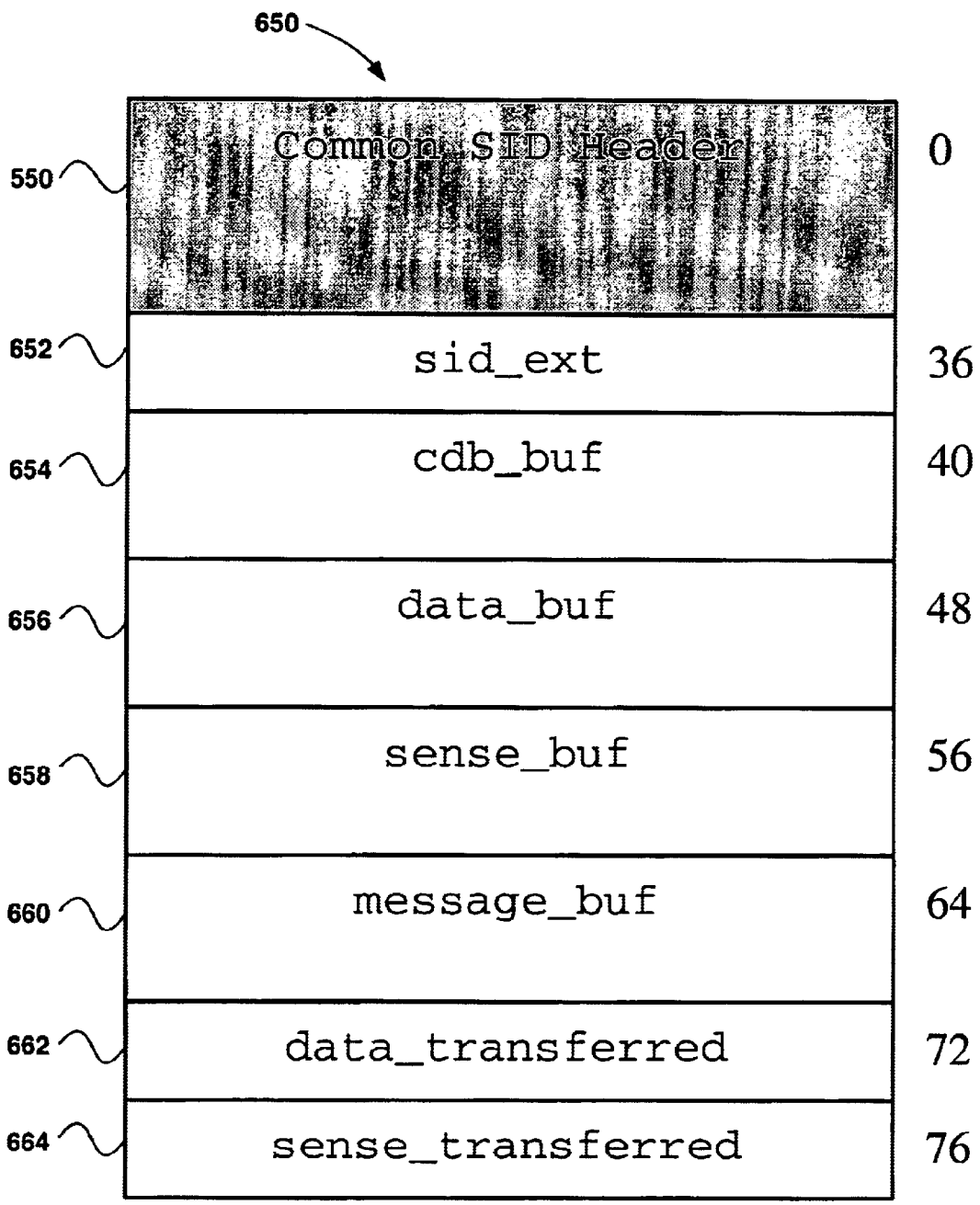
FIG. 12 is a block diagram showing a SCSI SID, in accordance with an embodiment of the present invention.

Having examined the basic SID operation, the manner in which additional information included in a SCSI SID will now be described. FIG. 12 is a block diagram showing a SCSI SID 650, in accordance with an embodiment of the present invention. Communication between the SCSI and SEP layers is performed using SCSI SID 650. Like all SIDs, the SCSI SID 650 includes a common header 550 portion.

In addition, the SCSI SID 650 includes a sid_ext 652, which is a pointer (type PVOID) to sixty-four bytes of additional scratch space which may be used by the recipient layer (SCSI or SEP as appropriate) for book keeping purposes. A cdb_buf 654 buffer descriptor (type ES_SGL which consists of a byte pointer and length) for the buffer containing the SCSI Command Data Block (CDB) is also included.

Further, the SCSI SID 650 includes a data_buf 656, which is a buffer descriptor (type ES SGL) for the buffer containing the SCSI data for a write, or the buffer into which data will be placed on a read, and a sense_buf 658, which is a buffer descriptor (type ES SGL) for the buffer into which sense data (if applicable) and status will be placed following the completion of a SCSI operation. The status is preferably right justified in the first long word (4 bytes) of the sense data.

FIG. 12 also shows a message buf 660 buffer descriptor (type ES_SGL) for the buffer containing a message, and a data_transferred 662 portion of the SCSI SID 650, which is a byte count (type unsigned long) of data transferred. Since the actual amount of data transferred may be less than size of buffer indicated in the data_buf 656 buffer descriptor, or the buffer descriptor may point to a scatter/gather list, this field is the only reliable source of the amount of data transferred.

In addition, the SCSI SID 650 includes a sense_transferred 664, which is a byte count (type unsigned long) of sense information transferred. As with data_transferred 662, this is the field to examine to determine the actual amount of sense data transferred.

As indicated above, the four "buf" fields are buffer descriptors which may point directly to a buffer (byte pointer to the beginning of buffer, and the buffer's length) or to a scatter gather list (SGL) of buffer pointers (byte pointer to base of SGL, and length of SGL). The length field of the buffer descriptor includes a flag bit in the high order part which indicates whether the buffer descriptor points to an actual buffer or an SGL. In addition, two more flags indicate the direction of data flow and whether the buffer is even valid. Preferred flag definitions are as follows:

| #define SCSI_BUF_OUT | 0x20000000 |
|---|---|
| #define SCSI_BUF_INDIRECT | 0x40000000 |
| #define SCSI_BUF_VALID | 0x80000000 |

In use, calls are made to various SCSI SID functions when communicating between network stack layers. These functions include SID_SCSI_REQUEST, SID_SCSI_MORE_DATA, SID_SCSI_REPLY, SID_SCSI_MESSAGE, SID_SCSI_CNCT_N_NEG, SID SCSI_NEG RSP, and SID_FREE_SCSI_SID. All these functions are preferably supported on both calls to SEP_Request and SCSI_Indication, described in greater detail subsequently.

The SID_SCSI_REQUEST function returns a SCSI SID having a CDB and possibly data, while the SID_SCSI_MORE_DATA function returns a data only SCSI SID. The SID_SCSI_REPLY function returns a SCSI SID with data and status, and the SID_SCSI_MESSAGE function returns a SCSI SID containing a message. The SID_SCSI_CNCT_N_NEG function causes a Connect and Negotiate SEP header to be sent or indicate reception of one, and finally, and finally, the SID_FREE_SCSI_SID function is called when an empty SCSI SID is being returned to the owning layer's free SID pool.

In use, the SCSI layer in the host creates the SCSI SIDs. When a new SCSI command arrives, a SCSI SID is fetched from the SCSI layer's SCSI SID pool, and the buffer descriptor fields are set to point to the supplied CDB, user data buffer, and sense buffer areas. The SID is then sent to the SEP with a call to SEP_Request. The SEP will allocate a Stream SID from its pool, and form a SEP header for the CDB as well as one or more data segments if the SCSI_BUF_OUT flag is set on the data buffer. It may require allocation of additional Stream SIDs for long writes. If the SEP's Stream SID pool becomes empty, the SCSI SID will be queued for later processing and the SEP_Request call will return with SID_PENDING status.

Each Stream SID is sent to the Transport layer as soon as it is filled. The SEP layer may choose to delay filling of Stream SIDs when sending data (e.g. SCSI writes) to allow interleaving of other SCSI commands, or because it needs to wait for GetSCSIData requests from the target. Again, it will return SID_PENDING in such a case. Even if the SEP is able to send all required Stream SIDs to the transport, the SEP cannot return SID_DONE to the SCSI layer if any of these SIDs were pending by the transport layer. This is because the original user buffers are preserved until all data has been successfully sent to the target. In this case the SEP will again return SID_PENDING.

Each SCSI transaction is sent to SEP as one SCSI SID, containing buffer descriptors for Command, Data and Status. A pointer for the SCSI SID is kept in a table indexed by tag number. This allows the receiving side of the SEP to use the buffer descriptors for returned status and read data. The receiving side SEP uses the tag value in each received SEP header to access the SCSI SID pointer, then uses the appropriate buffer descriptors to copy data from the received Stream SIDs to the user buffers specified in the SCSI SID.

Once the command and all write data has been sent to the transport layer, and the transport layer has returned the Stream SIDs to SEP, indicating that all information has been sent to, and acknowledged by, the transport layer on the target, the transaction state is updated to indicate that the SCSI SID can potentially be returned. It will actually be returned to the SCSI layer when the last packet of read data and/or status is received and copied. It should be borne in mind that, the status could actually be returned before the transport layer returned all of the Stream SIDs due to multithreading behavior. Thus, both events preferably happen before the SCSI SID is returned.

This copy operation uses almost three times as much CPU cycles as the rest of the header processing. Hence, the target bridge preferably avoids any copying by using the DMA capabilities of the NIC chip and the parallel SCSI chip to move information directly to/from the bridge's memory. In this embodiment, the SEP receive side manipulates pointers to data still resident in the receive packet buffers, rather than doing any copying. The resultant buffer descriptor list is passed to the SCSI chip and used to gather write data for transfer to the disk drive.

The sending side of the target's SEP layer operates similarly to that used in the host, except that SCSI SIDs are returned directly to the SCSI layer after all associated Stream SIDs have been returned, and multiple SCSI SIDs can be received for a given transaction. In this embodiment, the SCSI layer sends a SCSI SID representing a modest amount of read data (say 4–8 KB) to the SEP layer as it is received off the disk drive, resulting in longer transfers having several SCSI SIDs in this embodiment. The SEP layer adds a SEP header to each chunk of read data and passes it to the transport layer as a Stream SID. The SCSI layer considers the transaction complete when all SCSI SIDs had been returned. As each SCSI SID returns, the SCSI layer can re-use the data buffer associated with it for more read data.

The target receive data and SID flow for the pointer passing embodiment is quite different from the copying embodiment. The SEP layer maintains its own pool of SCSI SIDs to use for passing received commands, write data and messages to the SCSI layer.

For read transactions, only a SEP Command segment is sent to the target. The SEP allocates a SCSI SID and sets its cdb_buf descriptor to point to the CDB portion of the received segment. The SCSI SID is then sent to the SCSI layer. In one embodiment, the SCSI layer immediately sends the CDB to the disk drive and then returns the SCSI SID to SEP. However, in an alternative embodiment, the SCSI commands are queued and sorted before sending them to the drive, as discussed in greater detail subsequently. In this embodiment, the SCSI layer copies the CDB into another structure and returns the SCSI SID immediately, so that the associated NIC packet buffer can be re-used.

For write transactions, there is a danger that the NIC packet receive buffer resources could be exhausted by a heavy stream of writes. To avoid this, the bridge uses the GetSCSIData SEP commands to fetch write data only when it is actually needed.

A sorted queue of commands is maintained that includes SCSI SIDs in the SCSI layer. When a SCSI SID reaches the head of queue, its CDB is copied into a separate staging area, and the SCSI SID returned. If the write command SEP segment is immediately followed by write data, the data is passed as a separate SCSI SID.

If the SCSI SID is for a read command, operations are completed on the SEP receive side. If the SCSI SID is for a write type command, a GetSCSIData command is issued if required, and the data descriptor having SCSI SIDs is sent up to the SCSI Layer as they are filled by arriving Stream SIDs. As the data is sent to the drive, the SCSI SIDs are returned to the SEP layer, eventually freeing up the NIC packet buffers.

The SEP layer is supplied with the total amount of space allocated for the NIC receive packet buffers, which could be in bytes or the number of 1500 byte packets.

Some portion is "reserved" for SEP command segments (i.e. CDBs). The amount to reserve is a function of the size and percentage of write data, but a heuristic based on typical traffic can also be utilized. It should be borne in mind that occasional overflows are acceptably since the NIC driver is capable of handling occasional overflows. A shared SEP private variable is then initialized to the total amount remaining, which becomes the preferred maximum write pre-fetch amount.

As individual SEP sessions send GetSCSIData commands to the host, they decrement the shared variable by the amount that was requested. The shared variable is incremented again once the requested data has been consumed and the Stream SIDs released back to the transport.

To determine how much to request at one time, the maximum value determined above is used with decreasing amounts as the "remaining buffer" variable decreases. In this manner, both writes and reads proceed with minimal delay while maximizing the use of the target's packet and SCSI buffer memory.

In addition, pointer passing is preferably used with the EtherStorage HBA. For the pointer passing host firmware, the sending side operates similar to the sending side for the target. Command and write data segments are the items sent, and generally only a single SCSI SID needs to be sent from SCSI to SEP. On writes, the write data is copied directly out of the user's buffer. The SEP portion of the receive side also works the same as that for the pointer passing target. Since there will always be enough room allocated in the user buffer for all the received data, the GetSCSIData pointer is generally not used. The SEP copies modified pointers from the Stream SIDs into SCSI SIDs and passes the SCSI SIDs up to the SCSI layer. On a read reply, the SCSI layer utilizes the user buffer descriptors supplied with the original request and the buffer descriptors in the SCSI SIDs to build scatter/gather lists for a hardware copy (DMA) engine to use in copying the received data to the user's buffer. On a write reply the status is examined and the sense information may be copied if needed.

Figure 13:
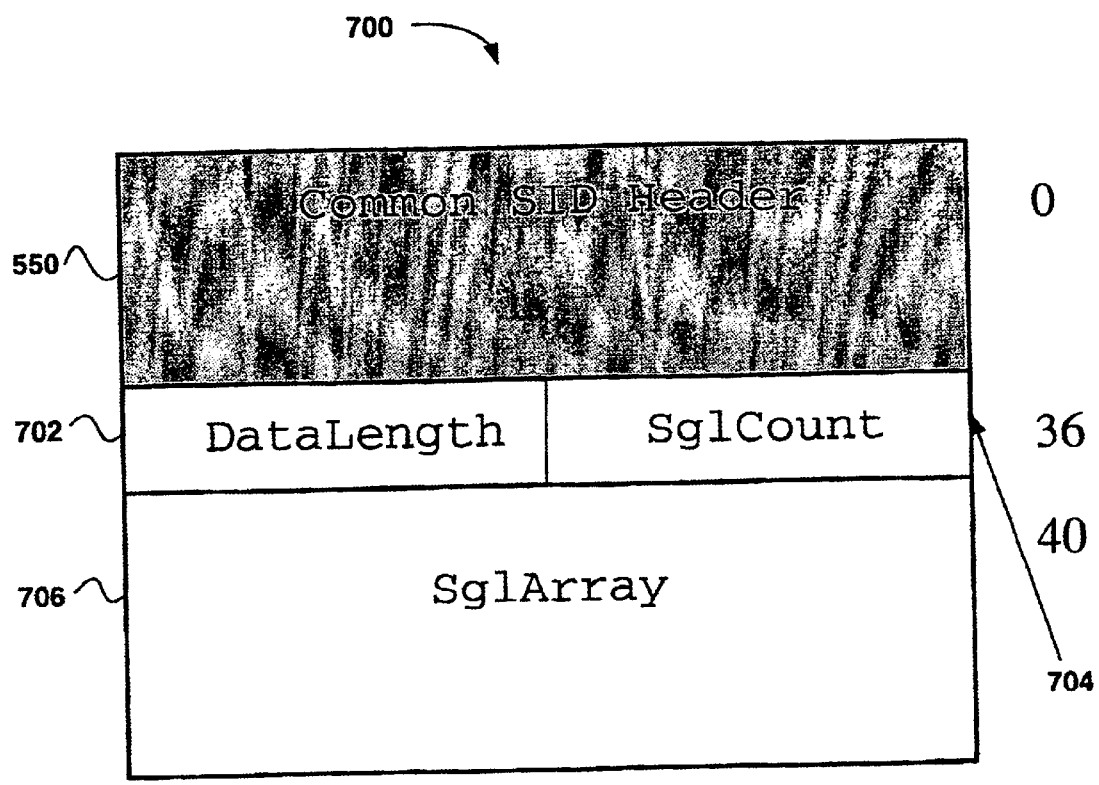
FIG. 13 is a block diagram showing a stream SID, in accordance with an embodiment of the present invention.

Communication between the SEP and STP layers is done using Stream SIDs. FIG. 13 is a block diagram showing a stream SID 700, in accordance with an embodiment of the present invention. The stream SID 700 includes a common SID header 550, a DataLength 702, a SglCount 704, and a SglArray 706.

Stream SIDs 700 are used for passing streams of bytes to and from a transport, such as the STP. The DataLength field

702 is the length in bytes of the total buffer of data represented by the scatter gather elements. In other words, the sum of the length fields of the SGLs in the array. The SglCount field 704 defines the total number of SGL Entries in the array, and the SglArray field 706 is the actual array of SGL entries. The array preferably fits in a maximum size SID, which leaves ninety-two bytes for the array.

In many ways, usage of the Stream SIDs 700 is similar to that of SCSI SIDs. Handles are obtained through Open SIDs, and the common SID header fields 550 are filled in essentially the same way. However, since the SEP has converted the various SCSI fields into a stream of bytes, there is an array of pointers to those bytes called the SglArray 706. The SGL array 706 is scanned from low address to high. The order of SGL entries represents the order that the associated data is actually sent.

On the host sending side, there is typically an SGL entry for a SEP Command Header, followed by an SGL entry for the buffer containing the CDB. A write type CDB can be followed by an SGL entry for a SEP data header and then pointers to data chunks.

On the target sending side, there is generally an SGL entry for a SEP data header and then a single SGL entry for a target data block. For both host and target receive sides the SGL array 706 generally includes an entry for the data portions of a received STP packet. In one embodiment, NIC packet array SIDs are implemented at the Transport to NIC interface. In this embodiment the received Stream SIDs 700 include SGL entries for several STP packets to improve efficiency.

It should be appreciated that the present invention is not limited to the transport of data over Ethernet. Although the specific examples were provided with reference to Ethernet technologies, other link and physical communication protocols can also be used for communication over networks (e.g., LANs, WANs, Internet, etc.) other than Ethernet. For completeness, some examples of link and physical communication protocols other than Ethernet may include FDDI, ATM, HIPPI, 100VG-Any LAN, and generically the Internet.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A network stack layer interfacing method for communication between network layers when transmitting network storage data via a computer network, the method comprising the operations of:

generating a first SCSI information descriptor (SID), a second SID, and a third SID, wherein the first SID includes a data memory address pointer to a first memory address of data to be transmitted via a computer network;

passing the data memory address pointer from the first SID to the second SID;

assigning a storage header memory address pointer to the second SID;

passing the storage header memory address pointer and the data memory address pointer from the second SID to the third SID;

assigning a first transport header memory address pointer to the third SID; and affording a network interface device access to the third SID, wherein the network interface device utilizes the third SID to transmit at least a portion of the data via the computer network.

2. A network stack layer interfacing method as recited in claim 1, further comprising the operation of generating a fourth SID, the fourth SID including a first offset memory address pointer to a first offset memory address, the first offset memory address being offset from the first memory address by a particular amount based on a maximum data packet size.

3. A network stack layer interfacing method as recited in claim 2, the network interface device is afforded access to the fourth SID.

4. A network stack layer interfacing method as recited in claim 3, further comprising the operation of generating a fifth SID, the fifth SID including a second offset memory address pointer to a second offset memory address, the second offset memory address being offset from the first offset memory address by a specific amount based on the maximum data packet size.

5. A network stack layer interfacing method as recited in claim 4, the network interface device is afforded access to the fifth SID.

6. A network stack layer interfacing method as recited in claim 5, wherein the fourth SID is assigned a second transport header memory address pointer, and wherein the fifth SID is assigned a third transport header memory address pointer.

7. A network stack layer interfacing method as recited in claim 6, wherein the third SID, the forth SID and the fifth SID are utilized to create a first data packet, a second data packet, and a third data packet, wherein the first data packet includes storage header data.

8. A network stack layer interfacing method for communication between software layers when receiving network storage data via a computer network, the method comprising the operations of:

generating a first SCSI information descriptor (SID), a second SID, and a third SID, wherein the third SID includes a first memory address pointer to a first packet buffer having data from a first received data packet;

passing the first memory address pointer from the third SID to the second SID;

modifying the first memory address pointer of the second SID to address a first offset memory address in the packet buffer, the first offset memory address being offset from the beginning address of the first packet buffer, wherein transport header data within the first packet buffer is skipped;

passing the first memory address pointer from the second SID to the first SID;

modifying the first memory address pointer of the first SID to address a second offset memory address in the packet buffer offset from the beginning address of the packet buffer, wherein the second offset memory address addresses a data chunk within the packet buffer; and copying the data chunk from the first packet buffer to system memory.

9. A network stack layer interfacing method as recited in claim 8, further comprising the operation of generating a fourth SID and fifth SID, the fifth SID including a second memory address of a second packet buffer having data from a second received data packet.

10. A network stack layer interfacing method as recited in claim 9, further comprising the operations of:

passing the second memory address pointer from the fifth SID to the fourth SID; and modifying the second memory address pointer of the fourth SID to address a third offset memory address in the second packet buffer, the third offset memory address being offset from the beginning address of the second packet buffer, wherein transport header data within the second packet buffer is skipped.

11. A network stack layer interfacing method as recited in claim 10, further comprising the operation of passing the second memory address pointer from the fourth SID to the first SID.

12. A network stack layer interfacing method as recited in claim 11, further comprising the operation of copying the data chunk from the second packet buffer to system memory.

13. A network stack layer interface unit for communication between software layers during network storage data transfer, the network stack layer interface unit comprising:

a header portion defining characteristics of the network stack, the header portion including a common header portion and a layer specific header portion; and a buffer descriptor defining a data buffer, the buffer descriptor including a memory address pointer having a memory address of the data buffer, the buffer descriptor further including a buffer length variable defining a size of the data buffer, wherein the memory address pointer is passed between network stack layers via the network stack interface unit, and wherein a first network stack layer creates the network stack interface unit and passes the network stack layer interface unit to another network stack layer.

14. A network stack layer interface unit as recited in claim 13, wherein the layer specific header portion includes characteristics of a SCSI layer.

15. A network stack layer interface unit as recited in claim 13, wherein the layer specific header portion includes characteristics of a STP layer.

* * * * *